United States Patent
Huang et al.

(10) Patent No.: US 10,430,272 B2
(45) Date of Patent: Oct. 1, 2019

(54) SECURE RAID SCHEMES FOR DISTRIBUTED STORAGE

(71) Applicant: California Institute of Technology, Pasadena, CA (US)

(72) Inventors: Wentao Huang, Pasadena, CA (US); Jehoshua Bruck, La Canada, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 298 days.

(21) Appl. No.: 15/415,707

(22) Filed: Jan. 25, 2017

(65) Prior Publication Data

US 2017/0213047 A1 Jul. 27, 2017

Related U.S. Application Data

(60) Provisional application No. 62/286,767, filed on Jan. 25, 2016.

(51) Int. Cl.

| | |
|---|---|
| *G06F 21/78* | (2013.01) |
| *H04L 29/06* | (2006.01) |
| *G06F 11/10* | (2006.01) |
| *G06F 21/60* | (2013.01) |
| *G06F 3/06* | (2006.01) |
| *H03M 13/29* | (2006.01) |
| *H03M 13/37* | (2006.01) |
| *H03M 13/13* | (2006.01) |
| *H03M 13/15* | (2006.01) |

(52) U.S. Cl.
CPC .......... *G06F 11/1004* (2013.01); *G06F 3/067* (2013.01); *G06F 3/0619* (2013.01); *G06F 3/0623* (2013.01); *G06F 3/0635* (2013.01); *G06F 3/0689* (2013.01); *G06F 11/1012* (2013.01); *G06F 21/602* (2013.01); *G06F 21/78* (2013.01); *H03M 13/2942* (2013.01); *H03M 13/373* (2013.01); *H03M 13/3761* (2013.01); *H03M 13/13* (2013.01); *H03M 13/1515* (2013.01)

(58) Field of Classification Search
CPC .... G06F 21/78; G06F 2212/40; G06F 3/0683; H04L 2209/00
See application file for complete search history.

(56) References Cited

U.S. PATENT DOCUMENTS

| | | | | |
|---|---|---|---|---|
| 2014/0380114 A1* | 12/2014 | Alexeev | ............ | H03M 13/2906 714/755 |
| 2017/0033806 A1* | 2/2017 | Arslan | ................ | H03M 13/356 |

OTHER PUBLICATIONS

A. Beimel, "Secret-Sharing Schemes: A Survey," *Coding and Cryptology*, 6639, 2011, pp. 11-46, Chapter 2, Department of Computer Science, Ben-Gurion University, Beer-Sheva, Israel.

(Continued)

*Primary Examiner* — Izunna Okeke
(74) *Attorney, Agent, or Firm* — Kilpatrick Townsend & Stockton LLP

(57) ABSTRACT

Disclosed are low-complexity schemes to store information in a distributed manner across multiple nodes of a computer system. The schemes are resilient to node failures and resistant to node eavesdropping. The disclosed schemes may be used in conjunction with RAID systems, and when used in such systems may be referred to as "secure RAID".

26 Claims, 6 Drawing Sheets

(56) References Cited

OTHER PUBLICATIONS

A. Bessani et al., "DepSky: Dependable and Secure Storage in a Cloud-of-Clouds," *ACM Transactions on Storage*, 2013, pp. 12:1-12:33, vol. 9, No. 4, University of Lisbon, Faculty of Sciences, Portugal.
R. Bitar et al., "Staircase Codes for Secret Sharing with Optimal Communication and Read Overheads" 2016, pp. 1-17, arXiv: 1512.02990.
G. R. Blakley et al., "Security of Ramp Schemes," *Advances in Cryptology—CRYPTO*, Conference Paper, Jan. 1984, LNCS 196, pp. 242-268, Springer-Verlag Berlin Heidelberg.
M. Blaum, et al., "EVENODD: an Efficient Scheme for Tolerating Double Disk Failures in RAID Architectures," *IEEE Transactions on Computers*, 1994, pp. 245-254.
P. M. Chen, et al., "RAID: High-Performance, Reliable Secondary Storage," *ACM Computing Surveys*, Jun. 1994, pp. 145-185, vol. 26, No. 2.
P. Corbett et al., "Row-Diagonal Parity for Double Disk Failure Correction," *USENIX Association—Proceedings of the Third USENIX Conference on File and Storage Technologies (FAST)*, (2004), pp. 1-14 (2004).
A. Fikes, "Storage Architecture and Challenges," *Google Faculty Summit*, Jul. 2010.
Gemalto, "2014 Year of Mega Breaches & Identity Theft: Findings from the 2014 Breach Level Index," *Tech. Rep.* (2014).
C. Huang et al., "Erasure coding in Windows Azure storage," *USENIX Annual Technical Conference (ATC)* (2012).
C. Huang et al., "STAR: an efficient coding scheme for correcting triple storage node failures," in *USENIX Conference on File and Storage Technologies (FAST)*, pp. 197-210 (2005).
W. Huamg et al., "Communication Efficient Secret Sharing," IEEE Transactions on Information Theory, Dec. 2016, pp. 7195-7206, vol. 62, No. 12.
W. Huang et al., Secure RAID Schemes for Distributed Storage, *IEEE International Symposium on Information Theory*, Jul. 2016, pp. 1401-1405.
W. Huang et al., Communication Efficient Secret Sharing, *IEEE Transactions on Information Theory*, 2016, pp. 7195-7206, vol. 62, No. 12.
J. Kurihara, et al., "A New (k, n)-Threshold Secret Sharing Scheme and Its Extension," 11$^{th}$ Information Security Conference, 2008 pp. 1-21, KDDI R&D Labs, Japan.
H. Luo et al., "Self-Securing Ad Hoc Wireless Networks," in International Symposium on Computers and Communications, 2002.
C. Lv et al., "Efficient Ideal Threshold Secret Sharing Schemes Based on EXCLUSIVE-OR Operations," *Proceedings—2010 4th International Conference on Network and System Security, NSS 2010*, pp. 136-143.
R. J. McEliece et al., "On Sharing Secrets and Reed-Solomon Codes," *Communications of the ACM*, 1981, pp. 583-584, vol. 24, No. 9, University of Illinois at Urbana-Champaign.
D. A. Patterson et al., "A Case for Redundant Arrays of Inexpensive Disks (RAID)," in *ACM*, 1988, vol. 17, No. 3, pp. 109-116, Computer Science Division, Dept. of Electrical Engineering and Computer Sciences, University of California, Berkeley.
I. S. Reed et al., "Polynomial Codes Over Certain Finite Fields," *J. of the Society for Industrial and Applied Mathematics*, 1960, vol. 8, No. 2, pp. 300-304.
J. K. Resch et al., "AONT-Rs: Blending Security and Performance in Dispersed Storage Systems," 2011, pp. 1-12, Cleversafe, Inc. and University of Tennessee.
A. Shamir, "How to Share a Secret," *Communications of the ACM*, 1979, pp. 612-613, vol. 22, No. 11.
M. W. Storer et al., "POTSHARDS—A Secure, Recoverable, Long-Term Archival Storage System," *ACM Transactions on Storage*, Jun. 2009, pp. 1-35, vol. 5, No. 2.
A. D. Wyner, "The Wire-Tap Channel," *Bell Syst. Tech. Journal*, 1975, vol. 54, No. 8.
L. Xu, et al., "Low-Density MDS Codes and Factors of Complete Graphs," *IEEE Transactions on Information Theory*, Sep. 1999, pp. 1817-1826, vol. 45, No. 6.
G. Zaitsev et al., "Minimum-Check-Density Codes for Correcting Bytes of Errors, Erasures, or Defects," *Probl. Inform. Transm.*, 1983, pp. 197-204, vol. 19, No. 3.

\* cited by examiner

| Node 1 | Node 2 | Node 3 | Node 4 | Node 5 | Node 6 |
|---|---|---|---|---|---|
| $u_1$ | $u_2$ | $u_3$ | $u_4$ | $u_5$ | $u_6$ |
| $u_3 \oplus u_5 \oplus m_1$ | $u_6 \oplus u_3 \oplus m_2$ | $u_2 \oplus u_1 \oplus m_3$ | $u_5 \oplus u_6 \oplus m_4$ | $u_1 \oplus u_4 \oplus m_5$ | $u_4 \oplus u_2 \oplus m_6$ |
| $u_2 \oplus u_6 \oplus m_3 \oplus m_5$ | $u_4 \oplus u_5 \oplus m_6 \oplus m_3$ | $u_6 \oplus u_4 \oplus m_2 \oplus m_1$ | $u_1 \oplus u_3 \oplus m_5 \oplus m_6$ | $u_3 \oplus u_2 \oplus m_1 \oplus m_4$ | $u_5 \oplus u_1 \oplus m_4 \oplus m_2$ |

*FIG. 3*

SECURE RAID SCHEMES FOR DISTRIBUTED STORAGE

CROSS-REFERENCES TO RELATED APPLICATIONS

This application claims the priority and benefit of U.S. Provisional Application No. 62/286,767 filed Jan. 25, 2016 entitled, "Secure RAID Schemes for Distributed Storage", by Wentao Huang and Jehoshua Bruck.

BACKGROUND

In the RAID (Redundant Array of Independent Disks) architecture for use with a computer system, information is stored distributively among multiple nodes, such as an array of disks or a cluster of networked computers, in a redundant manner that is resilient to individual node failures. See, for example, D. A. Patterson et al., *ACM SIGMOD*, 17(3):109-116 (1988); P. M. Chen, et al., *ACM Computing Surveys*, 26(2):145-185 (1994). The RAID architecture improves the reliability, availability, and performance of the computer system and has seen extensive applications in a variety of use cases over the decades since its introduction in the 1980's. See, for example, P. M. Chen, et al., *ACM Computing Surveys*, 26(2):145-185 (1994); C. Huang et al., *USENIX Annual Technical Conference (ATC)* (2012); and A. Fikes, *Google Faculty Summit* (2010).

As distributed storage systems are increasingly being used to store critical as well as sensitive data, the challenge of protecting data confidentiality is imminent. This is discussed, for example, in Gemalto, *Tech. Rep.* (2014). Nevertheless, the application of existing schemes to practical distributed storage systems can be limited by their complexities (see, e.g., J. Kurihara, S. Kiyomoto, K. Fukushima, and T. Tanaka, "A New (k,n)-threshold Secret Sharing Scheme and its Extension," ISC, 2008). For example, current schemes typically have much higher encoding and decoding complexities than the erasure codes employed in practice, that offer protection against failure but not against eavesdropping. The reasons are generally twofold: Firstly, erasure codes for distributed storage are typically encoded systematically so that the information symbols appear "in the clear", without encryption, in the codeword. This trivializes decoding when no erasure occurs and significantly simplifies encoding. In comparison, an eavesdropping-resistant secure scheme does not allow information symbols to appear in the clear and thus the encoding/decoding complexity is increased. Secondly, while there have been extensive studies on optimizing the encoding/decoding complexity of erasure codes and numerous good constructions are known, very little is known about how to design secure schemes with similar optimality. See, for example, M. Blaum, J. Brady, J. Bruck, and J. Menon, "EVENODD: an Efficient Scheme for Tolerating Double Disk Failures in RAID architectures," IEEE Transactions on Computers, Vol. 44, No. 2, pp. 192-202, 1995; and L. Xu, V. Bohossian, J. Bruck, and D. G. Wagner, "Low-density MDS codes and factors of complete graphs," IEEE Transactions on Information Theory, Vol. 45, No. 6, pp. 1817-1826, 1999.

Computer data storage techniques could advantageously utilize low-complexity schemes to store information in a distributed manner that is resilient to node failures and resistant to node eavesdropping. This document addresses these issues.

SUMMARY

This document discusses the novel concept of low-complexity schemes to store information in a distributed manner across multiple nodes of a computer system. The schemes are resilient to node failures and resistant to node eavesdropping. The disclosed schemes may be used in conjunction with RAID systems, and when used in such systems may be refered to as "secure RAID". The concept of systematic encoding according to the disclosed low-complexity schemes are generalized to the secure RAID use case and show that systematic schemes have significant advantages in the efficiencies of encoding, decoding, and random access. In this document, for the practical high rate regime, multiple XOR-based systematic secure RAID schemes are constructed with optimal or almost optimal encoding and decoding complexities, from the EVENODD codes, STAR codes, and B codes, which are array codes widely used in the RAID architecture. The schemes can tolerate up to three node failures and three eavesdropping nodes. For more general parameters, systematic secure RAID schemes are constructed using Reed-Solomon codes, and it is shown that such schemes are significantly more efficient than Shamir's "secret sharing" scheme (see, e.g., A. Shamir, CACM, 22(11) (1979)). The results obtained with the disclosed techniques suggest that building "keyless", information-theoretic security into the RAID architecture is practical.

This disclosure begins with an introduction and review of current issues in data confidentiality schemes and introduces the techniques discussed further below. This disclosure continues with a discussion of setup and definitions for understanding the techniques disclosed herein. This disclosure then discusses optimization considerations for the disclosed techniques, including lowest-density bounds, array-based secure RAID schemes, secure RAID from B codes.

Included in the discussion are examples of various implementations for using the secure distributed storage techniques disclosed herein. For example, the techniques for secure distributed storage among multiple data store locations may be implemented in a data encoder that receives data to be securely stored and then encodes that data (also referred to herein as "scrambling" the data) and transfers the encoded data to the multiple data store locations. The data encoder may be incorporated into a variety of hardware implementation, such as an external processor that communicates with a computer, a processor within a RAID controller device, a processing system that performs operations for an online secure data storage service provider, and the like. In addition, the data encoder may utilize components that may be shared with other components of the computer system, such as data erasure processors and the like.

Other features and advantages of the present invention should be apparent from the following description of exemplary embodiments, which illustrate, by way of example, aspects of the invention.

BRIEF DESCRIPTION OF THE DRAWINGS

FIG. 3 is a diagram that illustrates a secure RAID storage scheme, constructed in accordance with the disclosure, from B-codes.

DETAILED DESCRIPTION

I. Introduction

Figure 1:
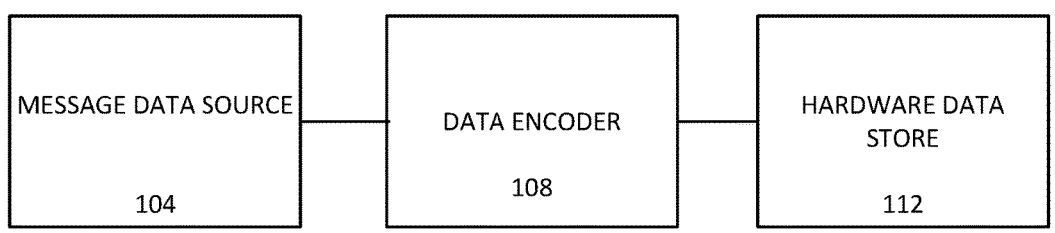
FIG. 1 is a block diagram that shows a configuration for utilization of the secure distributed data storage techniques described herein.

As disclosed below, a secure RAID scheme that provides a low-complexity scheme to store information in a distributed manner is described. The secure RAID scheme is resilient to node failures and resistant to node eavesdropping. The concept of systematic encoding according to the disclosed low-complexity schemes are generalized to the secure RAID use case and show that systematic schemes have significant advantages in the efficiencies of encoding, decoding, and random access. For the practical high rate regime, multiple XOR-based systematic secure RAID schemes are constructed with optimal or almost optimal encoding and decoding complexities, from the EVEN-ODD codes, STAR codes, and B-codes, which are array codes widely used in the RAID architecture. The schemes can tolerate up to three node failures and three eavesdropping nodes. For more general parameters, systematic secure RAID schemes are constructed using Reed-Solomon codes, and it is shown that such schemes are significantly more efficient than Shamir's "secret sharing" scheme (see A. Shamir, CACM, 22(11) (1979)). The results obtained with the disclosed techniques suggest that building "keyless", information-theoretic security into the RAID architecture is practical.

As noted above, in the RAID architecture, information is stored distributively among multiple system nodes, such as an array of disks or a cluster of networked computers, in a redundant manner that is resilient to individual node failures. Currently, as distributed computer data storage systems are increasingly being used to store critical as well as sensitive data, the challenge of protecting data confidentiality has acquired an amount of urgency. See, for example, Gemalto, *Tech. Rep.* (2014). Described herein is a proposed secure RAID scheme, which in addition to being failure-resilient, is also resistant to eavesdroppers who might otherwise compromise individual nodes. Specifically, discussed is the problem of storing a message among n nodes such that any n-r nodes can decode the message but any coalition of z nodes cannot infer any information about the message.

The message storing problem was generally studied in the literature under the context of what have been called "secret sharing" schemes (see, e.g., A. Beimel, *Coding and Cryptology*, 6639 (Chapter 2):11-46 (2011)), and rate-optimal schemes (i.e., schemes that store a message of maximum size given parameters n, r, z). In general, such schemes are known such as Shamir's scheme, after A. Shamir, *CACM*, 22(11) (1979), and its "ramp" version, for which see G. R. Blakley and C. Meadows, *Advances in Cryptology—CRYPTO*, 96:242-268 (1985). Nevertheless, application of secret sharing schemes to distributed storage systems has been generally limited by their relatively high complexities. See, for example, J. Kurihara et al., *ISC* (2008); M. W. Storer et al., *ACM Transactions on Storage*, 5(2):1-35 (2009); J. K. Resch and J. S. Plank, *USENIX FAST* (2011); and C. Lv et al., *Proceedings—2010 4th International Conference on Network and System Security, NSS* 2010, pp. 136-143 (2010). More particularly, existing secret sharing schemes are significantly more intensive in terms of computation and access complexity than their erasure code counterparts (without the security guarantee), such as Reed-Solomon codes (c.f. F. J. MacWilliams and N. J. A. Sloane, *The Theory of Error—Correcting Codes*, North Holland Publishing (1977)) and EVENODD codes (c.f. M. Blaum et al., *IEEE Transactions on Computers*, 44(2):192-202 (1995). Such codes are extensively employed in practical storage systems, notably for the RAID architecture.

In this document, the design of low-complexity schemes, termed secure RAID schemes, is discussed. Such schemes may have similar computational complexities as their erasure code counterparts and, in accordance with the disclosure herein, may be suitable for the application of distributed storage techniques for the disclosed secure RAID. Codes for storage are typically encoded in a systematic manner, for better efficiency in encoding, decoding and random access (decoding partial message). In the disclosed secure RAID, while storing the message in the clear is not allowed due to the secrecy requirement, the concept of systematic encoding is generalized and systematic secure RAID schemes are proposed.

FIG. 1 is a block diagram that shows a configuration for utilization of the secure distributed data storage techniques that are described herein. In the computer system 100, a data source 104 of data communicates with a data encoder 108. The system 100 is constructed in accordance with the techniques disclosed herein. The data encoder 108 is responsible for data key management and message scrambling, as described further below. The data encoder communicates with a hardware data store 112, which includes multiple data storage nodes, or locations. For example, the data store 112 may include multiple disk drives of a RAID array, or may comprise multiple network node locations at which data may be stored. Each of the data store locations, for example, may be one or more nodes of an online storage provider, such as "Dropbox" or "Google Store" or other "cloud storage" services. These services may be "mixed and matched" to collectively make up the data store 112. The data encoder 108 and data store 112 may be constructed in a single component, such as a self-contained RAID storage station device or the like. The data source 104 is a system user with messages (i.e., data) that is in need of secure storage.

Figure 2:
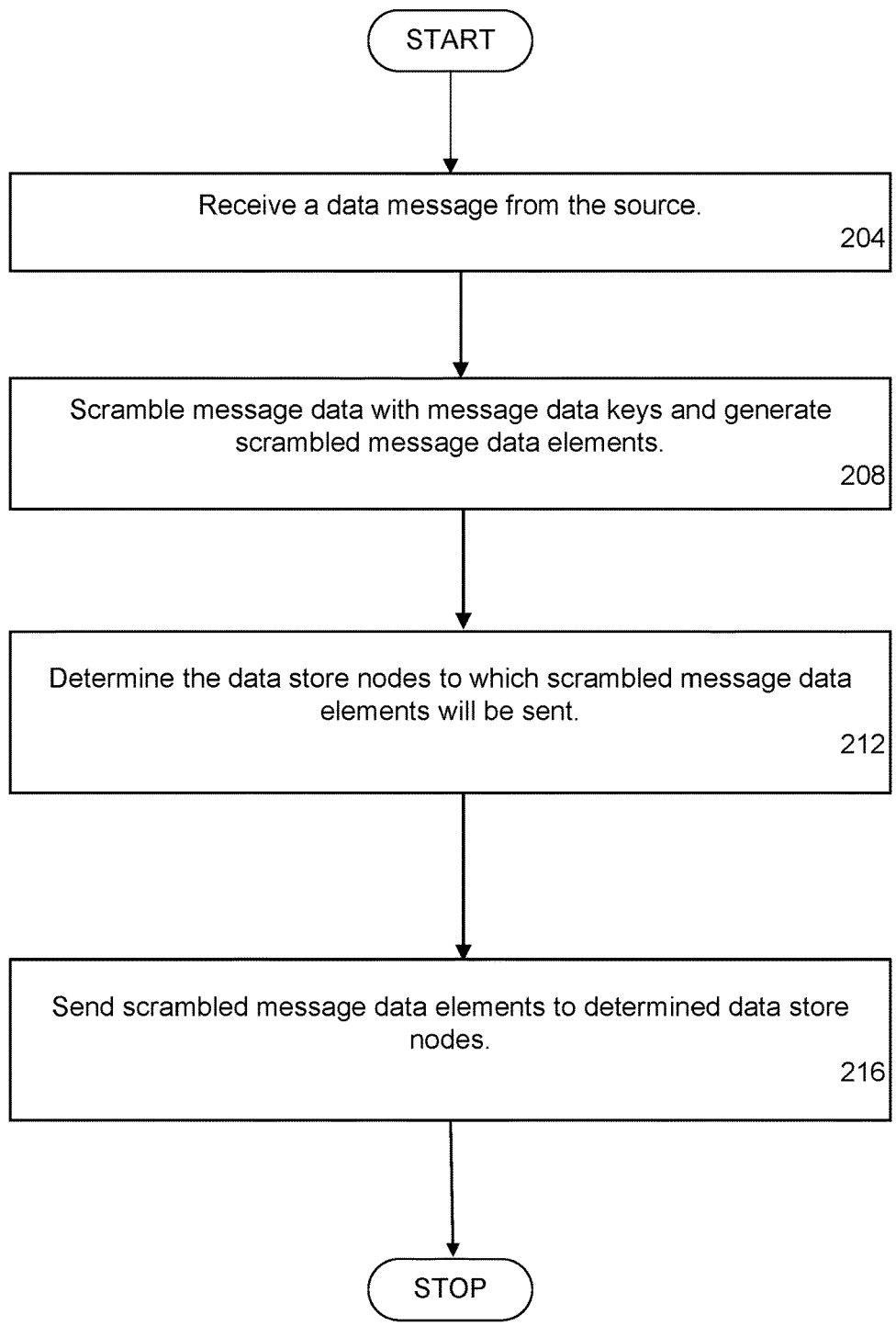
FIG. 2 is a flow diagram that shows programming operations of a data storage system constructed in accordance with the description herein.

FIG. 2 is a flow diagram that shows programming operations of a data storage system constructed in accordance with the description herein. The data storage system may comprise, for example, a system 100 such as illustrated in FIG. 1, which includes a data source 104, a data encoder 108, and a hardware data store 112, as shown in FIG. 1.

The operations in FIG. 2 begin at the flow diagram box 204 with receiving the message data at a data encoder 108 from a data source 104 (FIG. 1). The data source is a user of the secure storage service as disclosed herein. The user may send a message, comprising one or more bits of data, from a device that is in communication with the data encoder. The communication may occur over a hard-wired physical connection, such as a data cable or optical connection, or the communication may occur over a wireless connection, such as Wi-Fi, radio frequency, cell phone, or the like, or the communication may occur over a combination of such connections. The message data received at the data encoder may comprise a single bit of data, or it may comprise multiple bits of data, in accordance with the construction of the system 100 (FIG. 1). That is, the message data is whatever data payload may be received from the user for secure storage, and may comprise a single bit, or multiple bits, or messages, for secure storage. The message data may be subdivided into symbol words of a code alphabet, or may in some other way represent values having significance to the user. It is the message data that it is desired to keep secure, for preservation of secrecy.

The next operation after receiving the message data, at the FIG. 2 box 208, includes scrambling the message data at the data encoder 108 (FIG. 1) with one or more predetermined message keys and generating scrambled message data elements. As described further below, the message data is processed with the message keys, with or without encryption, to produce the scrambled message data. The scrambled message data may comprise one or more bits, and is stored with the message keys and with check bits (i.e., parity). The scrambled message data may be arranged into an array of data for storage. The scrambling may be achieved through encoding operations, in which random symbols are encoded with a first erasure code and are summed (added) with the message data to produce a summed codeword. The random symbols may be generated by the data encoder on the fly, in real time, during message processing, or the random symbols may be known and stored beforehand, for subsequent use. The scrambling operation may further involve encoding the summed codeword with a second erasure code to produce multiple output symbols, comprising scrambled message data elements.

After the source data comprising the message is scrambled, the next operation at the box 212 is for the data encoder to determine the nodes of the hardware data store 112 (FIG. 1) to which the scrambled message data elements will be sent for secure storage. The hardware data store may comprise nodes that are, for example, multiple disk drives of a RAID array, or may comprise multiple nodes of a computer system. For example, the nodes may comprise multiple storage locations of a network, controlled by a single entity, or the nodes may comprise multiple "cloud" storage locations that are controlled by separate and independent entities (such as "Dropbox" or "Google Store" or other "cloud storage" services).

After scrambling, in the box 216, the last operation is for the data encoder to send the scrambled message data elements to the determined nodes of the hardware data store 112 (see FIG. 1).

FIG. 3 shows an example of a systematic scheme, which can optimally tolerate two node erasures and two eavesdropping nodes. For general parameters n, r, and z, the example of FIG. 3 presents a systematic, rate-optimal scheme based on Reed-Solomon (RS) codes, and shows that its computational complexity is significantly better than Shamir's scheme, which is also related to RS codes, but is not systematic. For additional information on RS codes, see, e.g., R. J. McEliece and D. V. Sarwate, *Commun ACM*, 24(9):583-584 (1981). Nevertheless, RS codes require computation over finite fields which can complicate implementation and affects computational efficiency (see, e.g., M. Blaum et al., *IEEE Transactions on Computers*, 44(2):192-202 (1995)). Designs of more efficient XOR-based array codes have been extensively researched. See, e.g., M. Blaum et al., *IEEE Transactions on Computers*, 44(2):192-202 (1995); L. Xu et al., *IEEE Transactions on Information Theory*, 45(6):1817-1826 (1999); P. Corbett et al., *USENIX Symposium on File and Storage Technologies (FAST)*, pp. 1-14 (2004); C. Huang and L. Xu, *USENIX Conference on File and Storage Technologies (FAST)*, pp. 197-210 (2005).

FIG. 3 shows a secure RAID scheme constructed from B-codes (see L. Xu et al., *IEEE Transactions on Information Theory*, 45(6):1817-1826 (1999)). Symbols are bits, and operations are exclusive-OR (XOR) operations. More particularly, the codeword of an array code is a t×n array; each node stores a column of the array so that erasure and distance are defined column-wise. Well-known families of MDS (Maximum Distance Separable) array codes suitable for RAID include the EVENODD (see, e.g., M. Blaum et al., *IEEE Transactions on Computers*, 44(2):192-202 (1995)), and B-codes (see, e.g., L. Xu et al., *IEEE Transactions on Information Theory*, 45(6):1817-1826 (1999)). The generator matrices of these codes are "low-density" (i.e., sparse), and hence encoding them requires an optimal or almost optimal number of XOR operations.

This disclosure makes several contributions in the design of array-based secure RAID schemes. We study the density of the generator matrix (defined similarly as the generator matrix of linear codes) of secure RAID schemes and prove a lower bound. The density characterizes the number of operations required by encoding. Three families of secure RAID schemes are constructed, based on the B-codes and EVENODD codes. For example, see FIG. 3 and the discussion above. The exemplary schemes are XOR-based, rate-optimal, and have low or lowest density generator matrices. Specifically, the schemes can correct $r \leq 2$ node erasures and resist $z \leq 2$ eavesdropping nodes. In these schemes, encoding each bit of a message on average requires slightly more than $r+z=4$ XOR operations and decoding each bit of a message when no erasure occurs on average requires $z=2$ or slightly more XOR operations. It is shown below that these encoding and decoding complexities are optimal or almost optimal.

The results suggest that building "keyless", information-theoretic security into the RAID architecture is practical. More particularly, for distributed storage systems that are coded using Reed-Solomon code, EVENODD code, or B code, extending such systems to employ the proposed secure RAID schemes requires only minor modification to the implementation, with relatively small computational overhead and therefore small performance overhead.

Further with repect to FIG. 3, as noted above, the FIG. 3 scheme is able to correct two node erasures and is secure against two eavesdropping nodes. The FIG. 3 scheme is optimal in several senses. It has optimal rate and optimal field size. It follows a generalized systematic form: all keys are stored uncoded in the first row; all message bits are stored uncoded in the second row, each padded by an optimal number of two keys necessary to defeat two eavesdropping nodes; and the third row is redundant. The systematic form implies optimal decoding complexity as the message bits can be decoded by canceling the least amount of keys. The scheme is also optimal in terms of encoding complexity: every key and message bit is checked by an optimal number of two parities in the redundant (third) row necessary to correct two erasures. Schemes with similar optimal properties are constructed in Section VI-A for any length $p-1$, where $7 \leq p \leq 53$ is prime. Two infinite families of almost optimal schemes, which require only slightly more computation in encoding and decoding, are constructed in Section VI and V-A below.

II. Setup and Definitions

In this section, the problem of storing a message m in a distributed manner that is reliable against disk failures (i.e., erasures) and is secret against eavesdroppers will be considered. That is, for a storage system consisting of n nodes, a message m is encoded into n shares, i.e., each share for a node, so that (1) the message m can be decoded from any n−r shares, i.e., the erasure of any r shares can be corrected, and (2) any z shares do not reveal any information about the message, i.e., the shares are statistically independent of m.

More formally, let Q be a genric alphabet and let $[n]=\{1, \ldots, n\}$. For any index set $I \subset [n]$ and a vector $c=(c_1, \ldots c_n)$, let $c_I=(c_1)_{i \in I}$. An $(n, k, r, z)_Q$ secure RAID scheme is a randomized encoding function F that maps a secret message $m \in Q^k$ and a uniformly distributed random vector $u \in Q^v$, also referred to as keys, to the codeword $c=F(m, u) \in Q^n$, such that reliability and secrecy concerns are met. More particularly:

(Reliability) $\forall I \subset [n]$, $|I| \geq n-r$:$H(m|c_I)=0$, implying a decoding function $D_I:Q^{|I|} \to Q^k$ such that $D_I(c_I)=m$.

(Secrecy) $\forall I \subset [n]$, $|I| \leq Z$:$I(m;c_I)=0$.

Such schemes are referred to as the threshold ramp secret sharing schemes in the literature. See, e.g., G. R. Blakley and C. Meadows, *Advances in Cryptology—CRYPTO*, 96:242-268 (1985). This disclosure discusses the design of low-complexity schemes suitable for distributed storage, notably for the RAID architectures, and such schemes are referreed to herein as secure RAID schemes. These schemes can find a wide array of applications including, for example, securing disk arrays (where nodes are disks), securing cloud storage (where nodes are different cloud providers), and securing wireless networks (where nodes are wireless devices). For further discussion of securing disk arrays, see, e.g., J. K. Resch and J. S. Plank, "AONT-RS: blending security and performance in dispersed storage systems," in USENIX FAST, 2011. For further discussion of securing cloud storage, see, e.g., A. Bessani, M. Correia, B. Quaresma, F. Andre, and P. Sousa, "Depsky: Dependable and secure storage in a cloud-of-clouds," ACM Transactions on Storage, vol. 9, no. 4, pp. 12:1-12:33, 2013. For further discussion of securing wireless networks, see, e.g., H. Luo, P. Zerfos, J. Kong, S. Lu, and L. Zhang, "Self-securing ad hoc wireless networks," in International Symposium on Computers and Communications, 2002.

The linear schemes are of primary focus herein. Two types of linear schemes are discussed more fully herein, namely scalar schemes and array schemes. For a scalar secure RAID scheme, Q is a finite field $F_q$ and the encoding function F is linear over $F_q$. In this discussion, the notation of error-correcting codes for distributed storage will be followed. See, e.g., M. Blaum et al., *IEEE Transactions on Computers*, 44(2):192-202 (1995). For an array secure RAID scheme, Q is a vector space $F_q^t$ and m, u are regarded by the encoding function as vectors over $F_q$ of length tk and tv, simply by interpreting each symbol of $F_q^t$ as a block of length t over $F_q$. With this interpretation, m and u are denoted by $\bar{m}$ and $\bar{u}$ to avoid confusion. The encoding function F is linear over $F_q$, taking $\bar{m}$ and $\bar{u}$ as inputs. The output codeword is viewed as a t×n array with entries $c_{i,j}$ over $F_q$, $i=1, \ldots t$, $j=1, \ldots, n$. It should be noted that a column of the array corresponds to an entry of c over $F_q^t$, and that under the array representation erasure and eavesdropping are column-wise. Alternatively, the output codeword is denoted by $\bar{c}$ when regarded as a vector over $F_q$ of length tn, i.e., $\bar{c}=(c_{1,1}, \ldots, c_{t,1}, \ldots, c_{1,n}, \ldots, c_{t,n})$. It should be apparent that scalar schemes are special cases of array schemes with t=1. Without loss of generality, in the remaining part of this disclosure, it is assumed that the secure RAID schemes are array schemes. An $$[n, k]_{F_q^t}$$

array code C of minimum distance $d_{min}(C)=r+1$, where the Hamming distance is defined with respect to $F_q^t$, is equivalent to an $$(n, k, r, 0)_{F_q^t}$$

secure RAID scheme. The dual code of C is denoted by $C^\perp$.

In a nomenclature reminiscent of linear codes, the generator matrix of a linear secure RAID scheme is defined herein to be a (v+k)t×nt matrix G over $F_q$ such that $(\bar{u}, \bar{m})G=\bar{c}$. The first vt rows of G are referred to as the key rows that correspond to the message keys, and refer to the remaining kt rows as the message rows which correspond to the messages. It is useful to note that while two generator matrices with the same row space generate the same linear code, this is not necessarily true for secure RAID schemes. Particularly, let G be the generator matrix of a secure RAID scheme, performing elementary row operations on G in general will violate the secrecy condition. And as such, the resulting matrix, though it has the same row space as G, may not correspond to a valid scheme.

In this disclosure, the rate of an (n, k, r, z) secure RAID scheme is k/n and characterizes the space efficiency of the scheme. The optimal rate is known to be $$\frac{n-r-z}{n},$$

namely, the maximum message size is achieved when k=n−r−z. See, e.g., W. Huang et al., *arXiv*: 1505.07515 (2015). Constructions of rate-optimal schemes are well-known, such as Shamir's (ramp) secret sharing scheme, for which see A. Shamir, *CACM*, 22(11) (1979).

A secure RAID scheme is associated with an encoding algorithm and multiple decoding algorithms. The encoding algorithm as described herein is the algorithm of evaluating the encoding function F, and the decoding algorithms are the algorithms of evaluating the decoding functions $D_I$ for $|I| \leq n-r$, which are referred to as the systematic decoding algorithm when $|I|=n$ and are referred to as the erasure decoding algorithm when $|I|<n$. For a secure RAID scheme to be computationally efficient, two characteristics must hold: (1) the encoding/decoding algorithms should take a small number of operations to encode/decode per message symbol, and (2) the field size q should be small. The computational efficiency of secure RAID schemes is of immense practical importance, as it is closely related to the read and write performances of the storage systems. This disclosure also addresses the efficiency of secure RAID schemes in terms of random access, i.e., the operation of decoding a partial message. More specifically, discussion includes the computational and communication efficiency of decoding a single arbitrary entry of $\bar{m}$, in the setting that no erasure has occurred.

III. "Lowest Density" Bounds

This section discusses the requirements for an optimal number of message keys for utilization in the disclosed data storage scheme; theorems for optimality are described below. In this disclosure, the density of a vector or a matrix is defined to be the number of non-zero entries in the vector/matrix. Designing secure RAID schemes with low density generator matrices is important because such scheme requires a small number of operations in encoding. In this section, lower bounds on the density of the generator matrices of secure RAID schemes are reviewed. A related question of practical importance is to determine the amount of independent randomness, i.e., the number of keys, that are required by an optimal scheme. This latter question is addressed first. For that discussion, the following lemma, Lemma 1, is useful. The lemma is first presented, and is followed by the proof of the lemma. In this disclosure, the various elements of lemma, definitions, constructions, and theorems will be sequentially numbered within their like elements.

Lemma 1.

For any rate-optimal $$(n, k, r, z)_{F_q^t}$$

secure RAID scheme, and any $J \subset [n]$ such that $|J|=z$, it follows that $H(c_J)=zt$.

Proof.

Let the message m be uniformly distributed and suppose, for the sake of contradiction, that there exists $J \subset [n]$, $|J|=z$, such that $H(c_J)=zt-\varepsilon$ for some $\varepsilon > 0$. For the ease of notation, assume without loss of generality (by permuting the indexes if necessary) that $J=[z]$. By the well-known chain rule, $H(c_J)=\Sigma_{i=1}^{z} H(c_i|c_{[i-1]})=zt-\varepsilon$, and it follows that there exists $i' \in [z]$ such that $H(c_{i'}|c_{[i'-1]}) \le t-\varepsilon'$ for some $\varepsilon' > 0$. Hence $H(c_{i'}|c_{[z]\setminus\{i'\}}) \le t-\varepsilon'$. Without loss of generality (by permuting the indexes if necessary), assume that $i'=1$. Denote $[i,j]=\{i, i+1, \ldots, j\}$, it follows that $$I(m; c_{[2,z+1]}) \stackrel{(a)}{=} I(m; c_{[z+1]}) - I(m; c_1 | c_{[2,z+1]}) \quad (1)$$

$$\stackrel{(b)}{=} I(m; c_{[z+1]}) - I(m; c_{[z+2,z+k]} | c_{[z+1]}) -$$

$$I(m; c_1 | c_{[2,z+1]})$$

$$\stackrel{(c)}{=} kt - I(m; c_{[z+2,z+k]} | c_{[z+1]}) -$$

$$I(m; c_1 | c_{[2,z+1]})$$

$$\ge kt - H(c_{[z+2,z+k]}) - I(m; c_1 | c_{[2,z+1]})$$

$$\ge kt - (k-1)t - I(m; c_1 | c_{[2,z+1]})$$

$$= t - H(c_1 | c_{[2,z+1]}) + H(c_1 | c_{[2,z+1]}, m)$$

$$\ge t - H(c_1 | c_{[2,z+1]})$$

$$\ge t - H(c_1 | c_{[2,z]}), \text{ where}$$

$$\stackrel{(d)}{\ge} \varepsilon',$$

where (a) and (b) follow from the chain rule; (c) follows from the fact that the scheme is rate-optimal and so m can be decoded from $c_{[z+k]}$, as $z+k=n-r$; and (d) follows from the hypothesis $H(c_1|c_{[2,z]}) \le t-\varepsilon'$. But the last line of Equation (1) above contradicts the secrecy requirement, which implies that $I(m;c_{[2,z+1]})=0$. This completes the proof.

Next, Theorem 1 is presented, which relates to the determination of how many message keys will be needed for a secure distributed storage system of the selected parameters n, k, r, z. The theorem is presented, followed in the next paragraph by its proof.

Theorem 1.

A linear rate-optimal $$(n, k, r, z)_{F_q^t}$$

secure RAID scheme uses at least zt keys over $F_q$, and is equivalent to a scheme that uses exactly zt keys.

Proof.

Consider any linear $$(n, k, r, z)_{F_q^t}$$

scheme such that $k=n-r-z$. Recall that the keys is a length-v vector u over $F_q^t$, or equivalently a length-vt vector $\bar{u}$ over $F_q$. Let the message m be uniformly distributed. Then:

$$H(u) \ge I(c_{[z]}; u | m) \quad (2)$$

$$= H(c_{[z]} | m) - H(c_{[z]} | u, m)$$

$$\stackrel{(e)}{=} H(c_{[z]} | m)$$

$$\stackrel{(f)}{=} H(c_{[z]})$$

$$\stackrel{(g)}{=} zt,$$

where (e) follows from the fact that $c_{[z]}$ is a function of u and m; (f) follows from the secrecy requirement; and (g) follows from Lemma 1. Equation (2) implies that $v \le z$ because $H(u) \le vt$. This proves that the scheme uses at least zt keys over $F_q$. It remains to show that the scheme is equivalent to a scheme that uses exactly zt keys. Next, denote the generator matrix of the scheme by G, so that G is a $(v+k)t \times nt$ matrix with entries from $F_q$. Denote by $G_1$ the submatrix formed by the first vt rows (i.e., the key rows) and the first zt columns of G, denote by $G_2$ the submatrix formed by the last kt rows (i.e., the message rows) and the first zt columns of G, and denote by $\bar{u}'=\bar{u}G_1$. Then $\bar{c}_{[zt]}=\bar{u}G_1+\bar{m}G_2=\bar{u}'+\bar{m}G_2$. Let J be an arbitrary subset of [nt] such that $|J|=(z+k)t$, $[zt] \subset J$ and such that m can be decoded from $\bar{c}_J$. It should be apparent that the index set of the symbols stored by the first z nodes plus by any k additional nodes gives a valid J Next, $$H(\bar{c}_J | \bar{m}, \bar{u}') = H(\bar{c}_J) - I(\bar{c}_J; \bar{m}, \bar{u}') \quad (3)$$

$$\stackrel{(h)}{=} H(\bar{c}_J) - I(\bar{c}_J; \bar{m}, \bar{c}_{[zt]})$$

$$\le (z+k)t - I(\bar{c}_J; \bar{m}, \bar{c}_{[zt]})$$

$$\stackrel{(i)}{=} (z+k)t - I(\bar{c}_J; \bar{m}) - I(\bar{c}_J; \bar{c}_{[zt]} | \bar{m})$$

$$\stackrel{(j)}{=} zt - I((\bar{c}_J; \bar{c}_{[zt]} | \bar{m})$$

$$= zt - H(\bar{c}_{[zt]} | \bar{m}) + (\bar{c}_{[zt]} | \bar{m}, \bar{c}_J)$$

$$\stackrel{(k)}{=} zt - H(\bar{c}_{[zt]})$$

$$\stackrel{(l)}{=} 0,$$

where (h) follows from $\bar{c}_{[zt]}=\bar{u}'+\bar{m}G_2$; (i) follows from the chain rule; (j) follows from $H(\bar{m}|\bar{c}_J)=0$, and so $I(\bar{c}_J;\bar{m})=kt$; (k) follows from $[zt] \subset J$; and (1) follows from Lemma 1. For any $i \in [n]$, since there is a valid J such that $i \in J$, Equation (3) above implies $\bar{c}_i$ is a linear function of $\bar{m}$ and $\bar{u}'$. Note that re is a vector of length-zt with entries i.i.d. uniformly distributed over $F_q$. Hence, there exists a matrix G' such that $\bar{c}=(\bar{u}' \bar{m})G'$, i.e., G' is the generator matrix of an equivalent scheme that uses exactly zt keys. This completes the proof.

Thus, Theorem 1 shows that for rate-optimal schemes, zt keys are sufficient and necessary. In the remaining disclosure, it is assumed that a rate-optimal $$(n, k, r, z)_{F_q^t}$$

secure RAID scheme uses exactly zt keys, and as such the generator matrix G of the scheme has size (z+k)t×nt. The following theorem, Theorem 2, relates to a reduced complexity for the scheme, namely, it relates to the lower bounds for the density of G. Theorem 2 is presented, followed by its proof.

Theorem 2.

Consider the generator matrix of a rate-optimal $$(n, k, r, z)_{F_q^t}$$

secure RAID scheme, then the density of each key row is at least n−z+1, and the density of each message row is at least r+1.

Proof.

Denote by G the generator matrix. Let the message m be uniformly distributed. Let J be an arbitrary subset of [n] such that $|J|=k+z$, and let Z be an arbitrary subset of J such that $|Z|=z$, then:

$$H(c \mid c_J) = H(c, c_J) - H(c_J) \quad (4)$$
$$= H(c) - H(c_J)$$
$$\stackrel{(a)}{\le} (z+k)t - H(c_J)$$
$$= (z+k)t - H(c_{J\setminus Z} \mid c_Z) - H(c_Z)$$
$$\stackrel{(b)}{=} (z+k)t - H(c_{J\setminus Z} \mid c_Z) - zt$$
$$\le kt - I(m; c_{J\setminus Z} \mid c_Z)$$
$$= kt - H(m \mid c_Z) + H(m \mid c_J)$$
$$\stackrel{(c)}{=} kt - H(m \mid c_Z)$$
$$\stackrel{(d)}{=} 0,$$

where (a) follows from Theorem 1; (b) follows from Lemma 1; (c) follows from the fact that m can be decoded from $c_J$; and (d) follows from the secrecy requirement. Equation (4) above implies the erasure of any n−k−z entries of c can be corrected, and so that the row space of G is a code of minimum distance n−k−z+1=r+1. Therefore, each row of G must have at least r+1 non-zero entries. It remains to lower bound the density of the first zt rows of G. Let Z be an arbitrary subset of [n] such that $|Z|=z$, then:

$$H(u \mid c_Z, m) = H(u \mid m) - I(c_Z; u \mid m) \quad (5)$$
$$\stackrel{(e)}{=} zt - I(c_Z; u \mid m)$$
$$\stackrel{(f)}{=} zt - I(c_Z; u, m) + I(c_Z; m)$$
$$\stackrel{(g)}{=} zt - I(c_Z; u, m)$$
$$\stackrel{(h)}{=} zt - H(c_Z)$$
$$\stackrel{(i)}{=} 0,$$

where (e) follows from the independence between u and m; (f) follows from the chain rule; (g) follows from the secrecy requirement; (h) follows from the fact that $c_Z$ is a function of u and m; and (i) follows from Lemma 1. Equation (5) above implies that, if m is fixed to 0, then the erasure of any n−z entries of c can be corrected, as one can first recover u and then compute c. Therefore, the row space of the submatrix formed by the first zt rows of G is a code of minimum distance n−z+1. Therefore, the first zt rows of G each has at least n−z+1 non-zero entries. This completes the proof.

Next, from Theorem 2 a lower bound is obtained on the encoding complexity of an XOR-based (i.e., q=2) secure RAID scheme. The lower bound is given by Corollary 1, which is presented below, followed by its proof.

Corollary 1.

Encoding a rate-optimal (n, k, r, z) secure RAID scheme over $F_2^t$ requires at least $$r + z + \frac{rz - z}{n - r - z}$$

XORs per message bit.

Proof.

By Theorem 2, the density of the key rows is at least n−z+1 and the density of the message rows is at least r+1. By Theorem 1, there are zt key rows. As the scheme is rate-optimal, there are (n−r−z)t message rows. Therefore the density of the generator matrix is at least zt(n−z+1)+(n−r−z)t(r+1) and encoding it requires at least zt(n−z+1)+(n−r−z)t(r+1)−nt XOR operations. Therefore, the number of XORs amortized over the message bits is given by Equation (6) below:

$$\frac{zt(n-z+1) + (n-r-z)t(r+1) - nt}{(n-r-z)t} = n + r + \frac{rz-z}{n-r-z} \quad (6)$$

IV. Systematic Secure RAID Schemes

Conventional codes for distributed storage are typically encoded in a systematic way. Namely, a codeword contains two sets of symbols: the uncoded message symbols that appear "in the clear" (i.e., not encoded or encrypted), which are referred to as the systematic symbols, and the set of redundant symbols. Systematic codes have important advantages in terms of computational efficiency. Specifically, encoding systematic codes only requires computing redundant symbols. This may be especially important when the rate of the code is high, i.e., the number of redundant symbols is small compared to the number of systematic symbols, which is the usual case in data storage. Decoding of systematic codes is considered to be trivial in the usual case that no systematic symbols are erased. Likewise, random accessing of a subset of message symbols is efficient for systematic codes. For secure RAID schemes, conventional systematic encoding is forbidden by the secrecy requirement. This motivates to generalize the concept of systematic encoding under the context of secrecy.

In this discussion of systematic secure RAID schemes, the following definition of a secure RAID scheme will be used:

Definition 1. An $$(n, k, r, z)_{F_q^t}$$

secure RAID schemi is systematic if

The keys $\bar{u}=(\bar{u}_1, \ldots, \bar{u}_{tv})$ are stored in the uncoded form in tv entries of the codeword $\bar{c}$.

The message symbols $\bar{m}_1, \ldots, \bar{m}_{tk}$ are stored in the uncoded form in tk entries of the codeword $\bar{c}$, each padded by a linear function of the keys. Namely, in $\bar{c}$ there is an entry of the form $\bar{m}_i + f_i(\bar{u})$, for i=1, ..., tk.

For i=1, ..., tk, the padding function $f_i(\bar{u})$ is a function of exactly z keys.

The tv systematic key symbols and the tk systematic message symbols are referred to as the systematic symbols.

Similar to systematic codes, by requiring the systematic symbols to take the simplest possible form, systematic secure RAID schemes have strong advantages in terms of computational efficiency. Specifically, Definition 1: (1) ensures that encoding and decoding (when no erasure has occurred) the systematic key symbols are trivial; (2) ensures that encoding and decoding (when no erasure has occurred) the systematic message symbols only require computing the padding functions $f_i$'s; and (3) ensures that the $f_i$'s take the optimal form amenable to computation, in the sense that $f_i$ has to be a function of at least z keys in order to meet the secrecy requirement. Because otherwise if $f_i$ is a function of less than z keys, then an adversary can decode $\bar{m}_i$ by looking at no more than z entries of $\bar{c}$, a contradiction. Systematic schemes also have optimal efficiency in terms of random access, in the sense that decoding a single entry of $\bar{m}$ requires communicating and canceling a minimum number of z keys.

A. Method of Constructing Secure RAID Schemes

In this section, construction of secure RAID schemes will be discussed, more particularly, using a pair of erasure codes. First, a method is introduced to design systematic secure RAID schemes. The method falls under the general framework of coset coding, which dates back to Wyner's work on the wiretap channel. See A. Wyner, *Bell Syst. Tech. J.* (1975). In this discussion, however, special emphasis is placed on designing efficient and systematic schemes in the context of secure RAID.

In the first part of explaining the method, consider an $[n,k_1]$ code $C_1$ and an $[n,k_2]$ code $C_2$, both over an alphabet $F_q^t$, such that every codeword of $C_1$ is a codeword of $C_2$, i.e., $C_1$ is a subcode of $C_2$. Given such a pair of codes $C_1$ and $C_2$, a secure RAID scheme is constructed as follows. Encode $C_2$ systematically and denote the index set of the systematic symbols in the codeword by $I_2$. Encode $C_1$ systematically such that the index set $I_1$ of its systematic symbols satisfies $I_1 \subset I_2$ (which is possible as $C_1 \subset C_2$). Alternatively, it is possible to encode $C_1$ in more flexible ways, as long as there is a set of entries $I_1$ in the codeword such that $I_1 \subset I_2$ and such that $C_1$ can be decoded from the entries in $I_1$. The secure RAID scheme disclosed herein has two steps, as follows:

Step 1: Draw $tk_1$ random keys $\bar{u}$ independently and uniformly from $F_q$. Encode $C_1$ by regarding the keys $\bar{u}$ as information symbols to obtain a codeword, and then puncture (delete) all entries in the codeword that is not in $I_2$. Denote the punctured codeword by d. For example, if $I_1=[tk_1]$ and $I_2=[tk_2]$, then d is the vector consisting of the first $tk_2$ entries of the original codeword of $C_1$.

Step 2: Let $\bar{m}=(\bar{m}_1, \ldots, \bar{m}_{t(k_2-k_1)})$ be the secret message with entries from $F_q$, and denote by $e=d+(0,\bar{m})$, where 0 is a length-$tk_1$ zero vector corresponding to the entries in $I_1$ and $\bar{m}$ corresponds to the entries in $I_2 \setminus I_1$. Encode $C_2$ by regarding e as information symbols to obtain a codeword $\bar{c}$. $\bar{c}$ is a a length-tn vector over $F_q$, and is the output codeword of the secure RAID scheme. Note that the codeword c as a length-n vector over the original alphabet $F_q^t$ can be obtained by collapsing each length-t segment in $\bar{c}$ into one symbol over $F_q^t$.

The construction technique described above is illustrated in FIG. 4. More generally, in the framework described above, it is not necessary to encode $C_1$ and $C_2$ systematically. Instead, it suffices to choose any $I_1$ such that $\bar{m}$ can be recovered from the set of symbols indexed by $I_1$.

Figure 4:
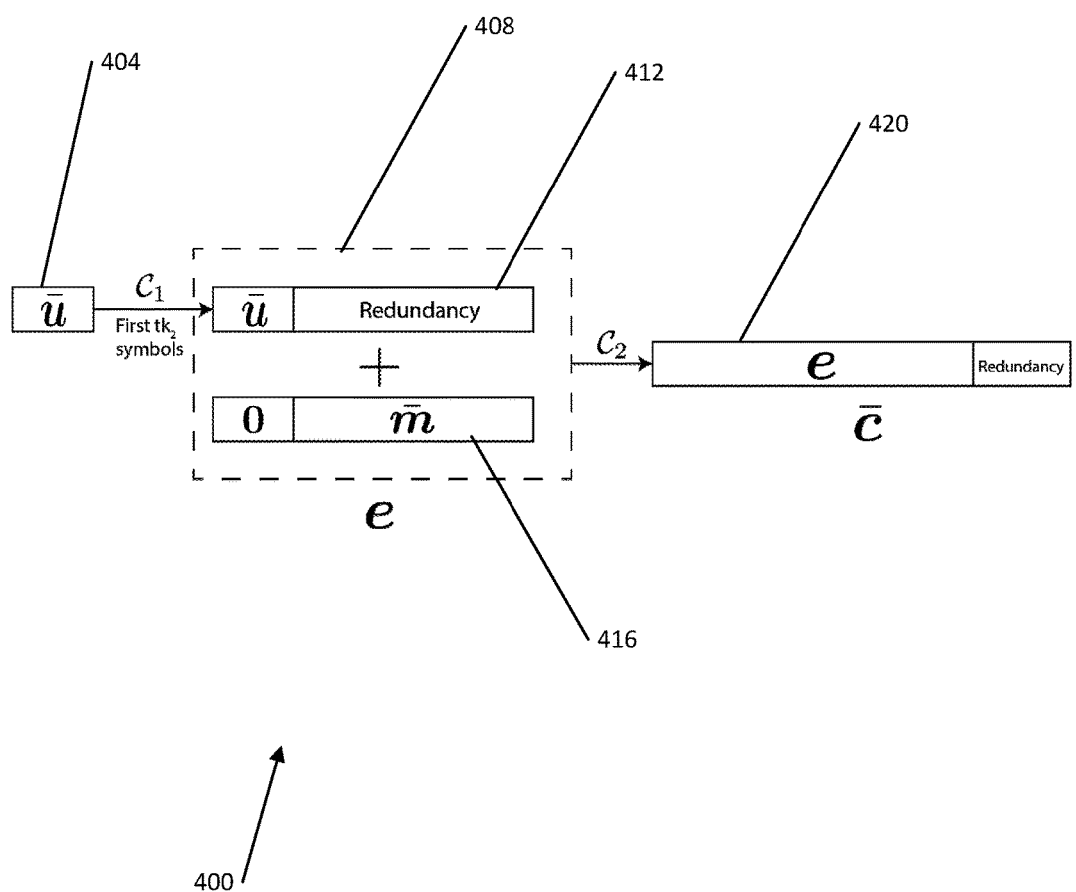
FIG. 4 is a diagram that illustrates operations of a secure data storage scheme in accordance with the disclosure, using a pair of erasure codes.

FIG. 4 is a representation 400 of operations to illustrate the construction technique, which also may be applied to the illustration of FIG. 3. In FIG. 4, the $\bar{u}$ in the box 404 represents the message keys, the first row of the array illustrated in FIG. 3. The $\bar{u}$ comprises the set of random symbols, discussed above. The redundadcy (erasure code) processing block 408, indicated by e beneath the box 408, is provided via the first erasure code $C_1$ and is represented by the second row of the array in FIG. 3. The $C_1$ in FIG. 4 represents the symbol size to split the message data from the received bit stream into a set of n symbols. The length (or number) of symbols into which the message may be split or divided is determined by the number of nodes in the hardware data store. Thus, if there are six nodes, then six symbols of $C_1$ will be used to parse the message data. If parsing the message with the six symbols leaves remaining bits that have not been associated with a symbol, then the encoder will repeat parsing the message, to pair the message with the six symbols of $C_1$. The parsing repeats until the entire data message has been parsed against the symbols of $C_1$. The redundancy e is provided via the second erasure code $C_2$ to the $\bar{c}$, represented by the third row in the array of FIG. 3.

Within the processing box 408, two encoding operations are indicated, comprising a first encoding operation that encodes the set of random symbols according to a first erasure code $C_1$ at 412, sums the multiple message symbols of m with a subset of the first erasure code $C_1$. The second encoding operation comprises encoding a subset of the summed codeword with a second erasure code $C_2$ (box 416) and produces output symbols 420 that are sent to nodes of the hardware data store Theorem 3 helps to define the basis for using erasure codes to generate the secure store scheme. The theorem is presented first below, followed by its proof.

Theorem 3.

Let $C_1$ be an $(n, k_1)$ code and $C_2$ be an $(n,k_2)$ code, both over $F_q^t$, such that $C_1$ is a subcode of $C_2$. Then the described encoding scheme is an $(n,k_2-k_1,r,z)$ secure RAID scheme over $F_q^t$, where $r=d_{min}(C_2)-1$ and $z=d_{min}(C_1^\perp)-1$.

Proof.

First show that the scheme meets the reliability requirement and the secrecy requirement. Because c is a codeword of $C_2$, and the minimum distance of $C_2$ is r+1, it follows that any r erasures of the entries of c can be corrected. Decoding m from c is simple, as one can read the systematic key entries $\bar{u}$ from $\bar{c}$, and then calculate d from $\bar{u}$, and then cancel d from the systematic message entries to obtain $\bar{m}$. This verifies the reliability requirement. The security requirement of the scheme will be verified next. Consider the case that the adversary observes a specific vector $c_I$, where I is the index set of the entries of c that are tapped by the adversary. Assume without loss of generality that |I|=z. Recall that F(m,u) is the encoding function of the scheme. It suffices to show that $Pr\{F_I(m, u)=c_I|m\}$ is a constant independent of the choice of m, where the probability is taken over the distribution of the keys. Consider the system of linear equations defined by $F_I(m, u)=c_I$ in variables u, where m and $c_I$ are fixed. Finding the number of solutions to this system is of interest and will be addressed next. Let $G_2$ be the $tk_2 \times tn$ generator matrix of $C_2$ over $F_q$, such that $(\bar{u}, \bar{m})G_2 = \bar{c}$. Let $G_1$ be the submatrix formed by the first $tk_1$ rows of $G_2$. Then $G_1$ is a generator matrix of $C_1$. Denote by $\bar{I}$ the index set of the entries of $\bar{c}$ corresponding to the set of entries indexed by $I$ in $c$, so that $|\bar{I}|=tz$. Then the set of columns of $G_1$ indexed by $\bar{I}$ must be linearly independent. To prove the claim, assume for the sake of contradiction that they are linearly dependent and so there exists a length-tn vector $\bar{v}$ such that $G_1\bar{v}^T=0$, and such that $v$ is non-zero only in the entries indexed by $\bar{I}$. Because $G_1$ is a parity check matrix of $C_1^\perp$, let $v$ be a length-n vector over $F_q^t$ obtained by collapsing each length-t segment in $\bar{v}$ into a symbol over $F_q^t$, then $v$ is a codeword of $C_1^\perp$ that is non-zero only in the entries indexed by $I$. Since $|I|=z$ but $d_{min}(C_1^\perp)=z+1$, this is a contradiction. Next, denote the submatrix formed by the last $tk_2$ rows of $G_2$ by $G_3$. For $i=1, 2, 3$, denote by $G_{i,\bar{I}}$ the submatrix formed by columns of $G_i$ indexed by $\bar{I}$. Then $F_1(m, u)=c_1$ is equivalent to $\bar{u}G_{1,\bar{I}} = \bar{c}_{\bar{I}} - \bar{m}G_{3,\bar{I}}$. Since $G_{1,\bar{I}}$ has full column rank, it follows that the system of equations $\bar{u}G_{1,\bar{I}} = \bar{c}_{\bar{I}} - \bar{m}G_{3,\bar{I}}$ in variables T1 always has a solution, and the number of solution is exactly $|Null(G_{1,\bar{I}})|$, where $Null(A)$ is the left null space of matrix $A$, i.e., $\{x:xA=0\}$. By the known rank-nullity theorem, $|Null(G_{1,\bar{I}})|=q^{t(k_1-z)}$. Because $\bar{u}$ is uniformly distributed, $Pr\{F_1(m, u)=c_1|m\}=|Null(G_{1,\bar{I}})|/q^{tk_1}=q^{-tz}$. This is independent of $\bar{m}$. This completes the proof.

Given that Theorem 3 holds true, we can also conclude Corollary 2. This relates to the situation where an [n,k] code C is MDS (maximum distance separable) if $d_{min}(C)=n-k+1$. An important special case of is that $C_1$ and $C_2$ are both MDS codes. In the discussion below, Corollary 2 is given first, followed by its proof.

Corollary 2.

If $C_1$ and $C_2$ are MDS codes, then the described encoding scheme is an $(n, k_2-k_1, n-k_2, k_1)$ secure RAID scheme. More particularly, the scheme has an optimal rate. Additionally, if the scheme is scalar, then it is systematic.

Proof.

First, a known fact is stated. Lemma 2. From L. Xu et al., IEEE Transactions on Information Theory, 45(6):1817-1826 (1999), and F. J. MacWilliams and N. J. A. Sloane, The Theory of Error-Correcting Codes, North Holland Publishing (1977), Lemma 2 states that a code C is MDS if and only if $C^\perp$ is MDS. Note that Lemma 2 is true for both scalar and array codes. Therefore, $d_{min}(C_2)=n-k_2+1$ and $d_{min}(C_1^\perp)=k_1+1$. Hence it follows from Theorem 3 that the scheme is an $(n, k_2-k_1, n-k_2, k_1)$ secure RAID scheme. It should be apparent that the scheme has optimal rate. To see that the scheme is systematic, it is only necessary to verify Condition 3 in Definition 1, which is trivially true when t=1 because $|\bar{u}|=k_1=z$. Hence, Corollary 2 is proved.

It should be noted that the construction method can be interpreted under the framework of coset coding in the following way. Denote by $f$ the codeword of $C_1$ by encoding $\bar{u}$, and denote by $g$ the codeword of $C_2$ by encoding $(0,\bar{m})$. Because $C_1$ is a subcode of $C_2$, $f$ is exactly the codeword of $C_2$ by encoding $d$ (which is the punctured $f$). Therefore, it follows from the linearity of $C_2$ that $\bar{c}=f+g$. Let $H_1$ be the systematic parity check matrix corresponding to the systematic generator matrix of $C_1$ that was employed in the scheme, then $H_1f^T=0$. And because $H_1$ is a systematic parity check matrix, $H_1g^T=\bar{m}^T$. Therefore, $H_1\bar{c}^T=H_1(f^T+g^T)=\bar{m}^T$. In this sense, the above encoding scheme can be understood as follows: to encode a secret message $\bar{m}$, the scheme picks a random element from the coset of $C_1$ whose syndrome is $\bar{m}$.

The construction method described above results in schemes that are almost systematic, where $I_1$ is the systematic key symbols, and $I_2 \backslash I_1$ represents systematic message symbols. This systematic form connects the computational complexity of the scheme to that of the codes. Specifically, the encoding complexity of the scheme is essentially the complexity of encoding $C_1$ and $C_2$. A simple systematic decoding algorithm for the scheme is to compute $d$ by encoding $C_1$ and then cancel it from $e$ to obtain $\bar{m}$, hence the complexity is dominated by encoding $C_1$. The erasure decoding algorithm first corrects the erasures by invoking the erasure correction algorithm of $C_2$, and then invokes the systematic decoding algorithm. So the complexity is essentially the complexity of (erasure) decoding $C_2$ plus encoding $C_1$. In words, to construct efficient secure RAID schemes, it suffices to find a pair of MDS codes $C_1$, $C_2$ of appropriate rates such that $C_1 \subset C_2$, and that $C_1$ can be efficiently encoded, and that $C_2$ can be efficiently encoded and decoded.

The construction method is also promising in terms of the simplicity of implementation. Specifically, the encoder of the secure RAID scheme consists of the encoders of $C_1$ and $C_2$. The decoder of the scheme consists of the encoder of $C_1$ (used in systematic decoding) and the decoder of $C_2$ (used in correcting erasures). Therefore, if $C_1$ and $C_2$ are amenable to implementation, then so are the secure RAID schemes.

B. Secure RAID from Reed-Solomon Codes

A natural choice of $C_1$ and $C_2$ in the construction method described in Section IV-A above are the Reed-Solomon codes. In fact, Shamir's scheme noted above can be viewed as being based on Reed-Solomon codes. See, e.g., R. J. McEliece and D. V. Sarwate, *Commun ACM*, 24(9):583-584 (1981). Nevertheless, it can be shown that a systematic scheme based on Reed-Solomon codes have significant advantage over Shamir's scheme in terms of computational efficiency. As a preliminary matter, the Definition 2 will be helpful.

Definition 2

(Reed-Solomon Codes) (see, e.g., I. S. Reed and G. Solomon, *Journal of the Society for Industrial and Applied Mathematics*, 8(2):300-304 (1960)). For any n>k, and any prime power q>n, let $S=\{\alpha_1, \ldots, \alpha_n\}$ be a set of distinct non-zero elements of $F_q$, the $[n,k]_{F_q,S}$ Reed-Solomon code has a generator matrix $$G = \begin{pmatrix} 1 & 1 & \ldots & 1 \\ \alpha_1 & \alpha_2 & \ldots & \alpha_n \\ \vdots & & & \vdots \\ \alpha_1^{k-1} & \alpha_2^{k-1} & \ldots & \alpha_n^{k-1} \end{pmatrix}. \quad (7)$$

An equivalent systematic generator matrix $G^*$ can be obtained by performing elementary row operations on $G$, such that $G^*$ contain an identity submatrix of size k. To construct secure RAID schemes based on Reed-Solomon codes, let $C_1$ and $C_2$ to be Reed-Solomon codes defined on the same S and such that $C_1$ has a smaller dimension than $C_2$. Theorem 4 follows from these considerations. Theorem 4 is presented below, followed by its proof.

Theorem 4.

For any integers n, r, and z such that n−r−z>0, a systematic, rate-optimal (n,n−r−z,r,z) secure RAID scheme over $F_q$ can be constructed by choosing $C_1$ to be an $[n,z]_{F_q,S}$ Reed-Solomon code and $C_2$ to be an $[n,n-r]_{F_q,S}$ Reed-Solomon code in the method described in Section IV-A above.

Proof.

By Defnition 2, the generator matrix of $C_1$ is a submatrix of the generator matrix of $C_2$, and hence $C_1$ is a subcode of $C_2$. It is well known that the Reed-Solomon codes are MDS (see, e.g., I. S. Reed and G. Solomon, *Journal of the Society for Industrial and Applied Mathematics*, 8(2):300-304 (1960)), and because Reed-Solomon codes are scalar codes, the Theorem 4 assertion follows from Corollary 2.

Theorem 4 indicates that a secure RAID scheme as disclosed herein can be generated using $C_1$ and $C_2$ from Reed-Solomon codes. For example, consider an (n,n−r−z,r,z) systematic secure RAID scheme based on Reed-Solomon codes. Encoding the scheme is essentially encoding $C_1$ and $C_2$, which takes $O((r+z)(n-r))$ operations (multiplications, divisions or additions) over $F_q$; systematic decoding the scheme is essentially encoding $C_1$, which takes $O(z(n-z-r))$; erasure/error decoding the scheme can be accomplished by first erasure/error decoding $C_2$ using the error-erasure version of the Berlekamp-Massey decoding algorithm, which takes $O(rn)$ operations, followed by systematic decoding. For the error-erasure versoin of the Berekamp-Massey decoding, see F. J. MacWilliams and N. J. A. Sloane, *The Theory of Error-Correcting Codes*, North Holland Publishing (1977).

In comparison, an (n,n−r−z,r,z) Shamir's (ramp) scheme can be viewed as the non-systematic version of the proposed scheme. Encoding Shamir's scheme requires evaluating a polynomial of degree n−r at n points which takes $O(n(n-r))$ operations; decoding Shamir's scheme (with or without erasures) requires interpolating the polynomial which takes $O((n-r)^2)$ operations by Lagrange interpolation. The proposed systematic scheme has significantly better computational efficiency than Shamir's scheme. Particularly, in the high rate regime that r and z are fixed and n grows, encoding and systematic decoding the systematic scheme both take $O(n)$ operations, whereas encoding and decoding (with or without erasures) Shamir's scheme both take $O(n^2)$ operations. It is noted that although (asymptotically) efficient $O(n \log n)$ algorithms are known for encoding and decoding Shamir's scheme, they have large overhead factors and are not commonly used in practice. See, e.g., D. Knuth, *The Art of Computer Programming*, Addison-Wesley (1998). Finally, the systematic scheme is also efficient in random access. Decoding one entry of m in the systematic scheme takes $O(z)$ operations and requires communicating z+1 symbols. Shamir's scheme, however, does not support random read access and all entries of m need to be decoded together, requiring $O((z+k)^2)$ operations and the communication of z+k symbols, where k=n−r−z.

V. Array-Based Secure RAID Schemes

Reed-Solomon codes require computation over finite fields, which can complicate implementation and affect computational efficiency. More efficient XOR-based array codes, e.g., have been proposed and are widely used in RAID. See, e.g., M. Blaum et al., *IEEE Transactions on Computers*, 44(2):192-202 (1995); L. Xu et al., *IEEE Transactions on Information Theory*, 45(6):1817-1826 (1999). The generator matrices of these codes are sparse, and hence encoding requires an optimal or almost optimal number of XOR operations. In this section, XOR-based array secure RAID schemes with optimal or almost optimal computational complexity from the array codes are considered. More particularly, the schemes discussed next have low-density generator matrices that achieve or approach the low bound discussed in Section III above.

An important idea in the construction is to design $C_2$ based on MDS array codes and to design $C_1$ based on their dual codes, in the construction method described in Section IV.A above. This is because the array codes and their duals: (1) are both MDS, so that the resulting secure RAID scheme is rate-optimal; (2) have high rate and low rate, respectively, so that the scheme has high rate; and (3) both have low or lowest density generator matrices, implying optimal or almost optimal encoding complexity, so that the scheme is efficient. Nevertheless, array codes and their duals are rarely known to contain each other. The codes can be modified appropriately to meet the subcode condition, while not compromising their complexity and distance. This idea is followed to construct three families of optimal and almost optimal schemes in the sequel below.

A. Secure RAID from EVENODD Codes

Using EVENODD codes can be useful, because such codes are generally preferred over Reed-Solomon codes due to the relative simplicity of EVENODD codes, because such codes are computationally more convenient, and utilize fewer parity bits. In this subsection, a family of low-complexity XOR-based secure RAID schemes is constructed from the well-known EVENODD codes. For such codes, see, e.g., M. Blaum et al., *IEEE Transactions on Computers*, 44(2):192-202 (1995). Below is discussed that the density of the generator matrix of the scheme approaches the lower bound in Theorem 2 above, and also discussed is that the scheme is almost optimal in terms of encoding complexity and systematic decoding complexity.

For the code construction, first let p be a prime number, and the EVENODD code is a [p+2,p] MDS array code over $F_2^{p-1}$ of minimum distance 3 and with a low density generator matrix. See, e.g., M. Blaum et al., *IEEE Transactions on Computers*, 44(2):192-202 (1995). FIG. 4 can be reviewed for an example of the case where p=5. The construction idea is described using this example. Denote the code in FIG. 4 by $C_2$, which corrects two column erasures. To build secrecy into $C_2$, consider its dual $C_2^\perp$, obtained by switching the roles of the information and parity bit, i.e., in FIG. 4 an information bit $c_{i,6}$ is checked by (parity) entries labeled by i in the top plot, and $c_{i,7}$ is checked by entries labeled by i and S in the bottom plot. Since $C_2$ is MDS, so is $C_2^\perp$. Also, $C_2^\perp$ is a [p+2,2] code for secrecy against two wiretapped nodes, i.e., if two columns of keys are encoded as information bits according to $C_2^\perp$ and pad this key array to a message array, then any two columns in the resulting array reveal no information about the message. This provides two efficient codes for reliability and secrecy, respectively. The challenge is to combine them into a single scheme that is both reliable and secure.

The straightforward approach for combining the two codes typically fails. However, as has been shown in Section IV.A, an efficient secure RAID scheme can be constructed if $C_1$ (the code for secrecy) is a subcode of $C_2$ (the code for reliability). In the example, $C_2^\perp$ is not a subcode of $C_2$. However, if column 1 and column 6 are switched in $C_2^\perp$ to obtain $C_1$ (encoding described in FIG. 3), then $C_1$ meets the subcode property. Based on $C_1$ and $C_2$ a secure RAID scheme can be constructed as follows. First, generate two columns of random keys, encoding the keys by $C_1$ but skipping the last two columns of the codeword. Next, pad the message bits to the 3rd through 5th columns of the key array. Finally, complete the last two columns by encoding $C_2$. Note that the first two columns store only keys, the next three columns store uncoded message bits padded by keys, and the last two columns are redundant. The encoding of keys is illustsrated in FIG. 4. The scheme corrects two erasures, and because $C_1 \subset C_2$, the encoding of keys in the last two columns is consistent with $C_1$ (see FIG. 4), implying secrecy against two wiretapped nodes. Hence, this provides a (7,3,2,2) secure EVENODD scheme.

The construction technique described above can be readily generalized by those skilled in the art to any prime number p. For an integer a, denote by $\langle a \rangle$ the unique integer m, $0 \leq m < p$, such that $a = m \pmod{p}$. The constructions in the next two paragraphs set forth examples of the technique.

Construction 1.

(EVENODD Code (see, e.g., M. Blaum et al., *IEEE Transactions on Computers*, 44(2):192-202 (1995)]). Let p be a prime, and $m_{i,j}$, $i \in [p-1]$, $j \in [p]$ be the message bits. The codewords of EVENODD forms a $(p-1) \times (p+2)$ array, described by the following encoding mapping: The first p columns of the array are the systematic symbols, i.e., for $i \in [p-1]$, $j \in [p]$, $c_{i,j} = m_{i,j}$. The last two columns are redundant symbols, i.e., for $i \in [p-1]$, $c_{i,p+1} = \oplus_{l=1}^{p} m_{i,l}$ and $c_{i,p+2} = S + (\oplus_{l=1}^{p} m_{\langle i-1-l \rangle, l})$, where $S = \oplus_{l=2}^{p} m_{\langle 1-l \rangle, l}$, and for the ease of notation, define $m_{0,j} = 0$.

Construction 2.

(Secure EVENODD) Let p be a prime. For $i \in [p-1]$, $j \in [p-2]$ and $l \in [2]$, let $m_{i,j}$ be the message bits, and let $u_{i,l}$ be the uniformly distributed key bits. The codewords of secure EVENODD forms a $(p-1) \times (p+2)$ array, described by the following encoding mapping. The first two columns of the array are the systematic key symbols, i.e., $c_{i,1} = u_{i,1}$ for $i \in [p-1]$, and denote $u_{\Sigma,2} = \oplus_{l=1}^{p-1} u_{l,2}$, $$c_{i,2} = \begin{cases} u_{i,1} \oplus u_{i+1,2} & i = 1, \ldots, p-2 \\ u_{i,1} \oplus u_{\Sigma,2} & i = p-1 \end{cases}$$

Using these techniques, below in Table 1 and Table 2 are provided an example of a code constructed using a [7,5] EVENODD code. Each column of Table 1 and of Table 2 represents a storage node of a hardware data store. Thus, in the system of these tables, the data store includes seven nodes, corresponding to seven independent storage nodes, such as disk drives of a RAID array, or seven network nodes of a storage system, or seven cloud storage locations, or the like.

TABLE 1

| 1 | 1 | 1 | 1 | 1 | $C_{1,6}$ |
| 2 | 2 | 2 | 2 | 2 | $C_{2,6}$ |
| 3 | 3 | 3 | 3 | 3 | $C_{3,6}$ |
| 4 | 4 | 4 | 4 | 4 | $C_{4,6}$ |

TABLE 2

| 1 | 2 | 3 | 4 | S | $C_{1,7}$ |
| 2 | 3 | 4 | S | 1 | $C_{2,7}$ |
| 3 | 4 | S | 1 | 2 | $C_{3,7}$ |
| 4 | S | 1 | 2 | 3 | $C_{4,7}$ |

In the two tables, for the [7,5] EVENODD code, the codeword is a 4×7 array. The first five columns (left to right) of the Table 1 array store information bits. Each parity bit $c_{i,6}$ in the sixth column from the left is the XOR of all entries labeled by i in the top plot. In the bottom table, Table 2, the seventh column parity bit $c_{i,7}$ is the XOR of all entries labeled by i and all entries labeled by S in the Table 2 plot.

Next, Tables 3 and 4 below illustrate the encoding of keys. More particularly, the encoding of keys in the (7,3,2,2) secure EVENODD, which is exactly the encoding of $C_1$. $i = 1, \ldots, 4$ in either the top array (Table 3) or bottom array (Table 4) represents that a key bit $u_{i,1}$ (or $u_{i,2}$) is added to the corresponding entry in the codeword array; and $\Sigma$ represents that $\oplus_{i=1}^{4} u_{i,2}$ is added. Note that the padding pattern is almost optimal, in the sense that most entries are padded by only two keys and that when more than two keys are padded, $\Sigma$ only needs to be computed once. Each column of the tables represents a storage node of a hardware data store.

TABLE 3

| 1 | 1 | 1 | 1 | 1 | 1 |
| 2 | 2 | 2 | 2 | 2 | 2 |
| 3 | 3 | 3 | 3 | 3 | 3 |
| 4 | 4 | 4 | 4 | 4 | 4 |

TABLE 4

| 2 | 3 | 4 | $\Sigma$ | 1 | 1 |
| 3 | 4 | $\Sigma$ | 1 | 2 | 2 |
| 4 | $\Sigma$ | 1 | 2 | 3 | 3 |
| $\Sigma$ | 1 | 2 | 3 | 4 | 4 |

Further with respect to Construction 2, the 3-rd to p-th columns of the array are the systematic message symbols, i.e., for $j = 3, \ldots, p$, the following is defined:

$$c_{i,j} = \begin{cases} u_{i,1} \oplus u_{\langle i+j-1 \rangle, 2} \oplus m_{i,j-2} & i + j \neq p + 1 \\ u_{i,1} \oplus u_{\Sigma,2} \oplus m_{i,j-2} & i + j = p + 1 \end{cases}$$

The last two columns of the array are redundant symbols, which are computed by encoding the EVENODD code described in Construction 1, regarding the first p columns of the array as information symbols.

The construction techniques illustrated above lead to another lemma, as noted below in Lemma 3. The lemma is listed first, followed by its proof.

Lemma 3.

In Construction 2, $c_{i,p+1} = u_{i,1} \oplus u_{i,2} \oplus (\oplus_{l=1}^{p-2} m_{i,l})$, and $c_{i,p+2} = u_{i,2} \oplus S' \oplus (\oplus_{l=1}^{p-2} m_{\langle i-1-l \rangle, l})$, for $i \in [p-1]$, where $S' = \oplus_{l=1}^{p-2} m_{\langle 1-l \rangle, l}$.

Proof.

It follows that $$c_{i,p+1} \stackrel{(a)}{=} \bigoplus_{l=1}^{p} c_{i,l}$$

$$\stackrel{(b)}{=} \left( \bigoplus_{l=1}^{p} u_{i,1} \right) + \left( \bigoplus_{\substack{l=2 \\ i+l \neq p+1}}^{p} u_{\langle i+l-1 \rangle, 2} \right) + \left( \bigoplus_{l=1}^{p-1} u_{l,2} \right) + \left( \bigoplus_{l=3}^{p} m_{i,l-2} \right)$$

$$= u_{i,1} \oplus \left( \bigoplus_{\substack{l=2 \\ i+l \neq p+1}}^{p} u_{\langle i+l-1 \rangle, 2} \right) \oplus \left( \bigoplus_{l=1}^{p-1} u_{l,2} \right) \oplus \left( \bigoplus_{l=3}^{p} m_{i,l-2} \right)$$

$$= u_{i,1} \oplus u_{i,2} \oplus \left( \bigoplus_{l=3}^{p} m_{i,l-2} \right)$$

$$= u_{i,1} \oplus u_{i,2} \oplus \left( \bigoplus_{l=1}^{p-2} m_{i,l} \right),$$

where (a) follows from Construction 1 and (b) follows from Construction 2; It also is the case that:

$$S \stackrel{(c)}{=} \bigoplus_{l=2}^{p} c_{\langle 1-l \rangle, l}$$

$$\stackrel{(d)}{=} \left( \bigoplus_{l=2}^{p} u_{\langle 1-l \rangle, 1} \right) \oplus \left( \bigoplus_{l=2}^{p} \bigoplus_{l'=1}^{p-1} u_{l', 2} \right) \oplus \left( \bigoplus_{l=3}^{p} m_{\langle 1-l \rangle, l-2} \right)$$

$$= \left( \bigoplus_{l=2}^{p} u_{\langle 1-l \rangle, 1} \right) \oplus \left( \bigoplus_{l=3}^{p} m_{\langle 1-l \rangle, l-2} \right)$$

$$= \left( \bigoplus_{l=1}^{p-1} u_{l, 1} \right) \oplus \left( \bigoplus_{l=3}^{p} m_{\langle 1-l \rangle, l-2} \right)$$

$$= \left( \bigoplus_{l=1}^{p-1} u_{l, 1} \right) \oplus \left( \bigoplus_{l=1}^{p-2} m_{\langle -l-1 \rangle, l} \right)$$

$$= \left( \bigoplus_{l=1}^{p-1} u_{l, 1} \right) \oplus S',$$

where (c) follows from Construction 1 and (d) follows from Construction 2. Next:

$$c_{i,p+2} \stackrel{(e)}{=} S \oplus \left( \bigoplus_{l=1}^{p} c_{\langle i+1-l \rangle, l} \right)$$

$$\stackrel{(f)}{=} S \oplus \left( \bigoplus_{\substack{l=1 \\ i+1-l \neq 0}}^{p} u_{\langle i+1-l \rangle, 1} \right) \oplus \left( \bigoplus_{\substack{l=2 \\ i+1-l \neq 0}}^{p} u_{l, 2} \right) \oplus \left( \bigoplus_{l=3}^{p} m_{\langle i+1-l \rangle, l-2} \right)$$

$$= S \oplus \left( \bigoplus_{l=1}^{p} u_{l, 1} \right) \oplus \left( \bigoplus_{\substack{l=2 \\ i+1-l \neq 0}}^{p} u_{l, 2} \right) \oplus \left( \bigoplus_{l=3}^{p} m_{\langle i+1-l \rangle, l-2} \right)$$

$$= S' \oplus \left( \bigoplus_{\substack{l=2 \\ i+1-l \neq 0}}^{p} u_{l, 2} \right) \oplus \left( \bigoplus_{l=3}^{p} m_{\langle i+1-l \rangle, l-2} \right)$$

$$= S' \oplus u_{i, 2} \oplus \left( \bigoplus_{l=3}^{p} m_{\langle i+1-l \rangle, l-2} \right)$$

$$= S' \oplus u_{i, 2} \oplus \left( \bigoplus_{l=1}^{p-2} m_{\langle i-1-l \rangle, l} \right),$$

where (e) follows from Construction 1 and (f) follows from Construction 2.

Further related to the code construction techniques disclosed herein, Theorem 5 is helpful. Theorem 5 is presented below, followed by its proof.

Theorem 5.

For any prime p, secure EVENODD is a (p+2, p−2,2,2) secure RAID scheme over $F_2^{p-1}$. In particular, the average density of the key rows of the generator matrix is $$\frac{3p-1}{2},$$

and the average density of the message rows is $$\frac{4p-5}{p-1}.$$

Proof.

The scheme is interpreted using the method described in Section IV.A above and by applying Corollary 2 to prove the correctness of the scheme. It is clear from the construction that $C_2$ can be regarded as the EVENODD code, the first two columns of the array as systematic key symbols, and the third to p-th columns as systematic message symbols. Note that although the keys are not stored in the uncoded form, decoding them from the systematic key symbols is trivial. The encoding mapping of $C_1$ is given by fixing all message bits to be 0 in Construction 2. Specifically, consider encoding $C_1$ by fixing all $m_{ij}$'s to be 0 in Construction 2, and then switch the first and (p+1)-th column of the obtained array. Denote the resulting code (after permuting the columns) by $C_1$ and the resulting array by $C'=(c'_{ij})$, and then by Construction 2 and Lemma 3, $$c'_{i,j} = \begin{cases} u_{i,1} \oplus u_{\langle i+j-1 \rangle, 2} & j = 1, \ldots, p, i+j \neq p+1 \\ u_{i,1} \oplus \left( \bigoplus_{l=1}^{p-1} u_{l, 2} \right) & j = 1, \ldots, p, i+j = p+1 \\ u_{i,1} & j = p+1 \\ u_{i,2} & j = p+2 \end{cases}, \quad (8)$$

where, for the ease of notation, define $u_{0,j}=0$. An algebraic description of the encoding mapping of equation (8) is utilized. Let $M_p(x) = x^{p-1} + x^{p-2} + \ldots + 1$ be a polynomial of degree p−1 over $F_2$. In terms of a (p−1)×(p+2) array, each column of the array is regarded as a polynomial modulo $M_p(x)$. Namely, use the notation $c(\beta) = c_{p-1}\beta^{p-2} + \ldots + c_2\beta + c_1$, i.e., a polynomial with an indeterminate $\beta$, to denote a polynomial modular $M_p(x)$, then the $c(\beta)$ correspond to the column vector $(c_1, \ldots, c_{p-1})^T$. Let $c(\beta)d(\beta)$ denote polynomial multiplication modular $M_p(x)$, and note that $\beta c(\beta)$ corresponds to the column vector $(c_{p-1}, c_1+c_{p-1}, c_2+c_{p-1}, \ldots, c_{p-2}+c_{p-1})^T$. Using this polynomial representation, the encoding mapping of equation (8) is equivalent to: $\{C' = (c'_1(\beta), \ldots, c'_{p+2}(\beta)) : c'_j(\beta) = u_1(\beta) + \beta^{j-1}u_2(\beta), j=1, \ldots, p, c'_{p+1}(\beta) = u_1(\beta), c'_{p+2}(\beta) = u_2(\beta)\}$ and the generator matrix of $C_1$ using the polynomial representation is given by:

$$\begin{pmatrix} 1 & 1 & \ldots & 1 & 1 & 0 \\ 1 & \beta & \ldots & \beta^{p-1} & 0 & 1 \end{pmatrix}. \quad (9)$$

It should be apparent that any two columns of the above generator matrix are linearly independent and so the code $c_1^{\perp}$ has a minimum distance of 3 and therefore is MDS. By Lemma 2 above, $C_1$ is MDS, with minimum distance p+1. It should be noted that equation (9) above is a parity check matrix of the EVENODD code and therefore $c_1^{\perp}$ is exactly $C_2$. Therefore by Corollary 2, Construction 2 is a (p+2, p−2,2,2) secure RAID scheme. Next, the density of the generator matrix of secure EVENODD will be analyzed. Recall that a key/message bit is checked by if the entry in the generator matrix corresponding to the key/message bit and $c_{ij}$ equals 1. Then, by construction, each of the $u_{i,1}$'s is checked for p+1 times, and each of the $u_{i,2}$'s is checked for 2(p−1) times. Each of the $m_{i,j}$'s, is checked for three times if i+j≠p−1, and is checked for 2+p−1=p+1 times if i+j=p−1. This completes the proof.

By Theorem 2 above, a lower bound on the density of the key rows is p+1 and a lower bound on the density of the message rows is three. Therefore, the scheme achieves the lower bound within a factor of 3/2 for the key rows and within a factor of 4/3 for the message rows.

Systematic decoding with the scheme is straightforward by first decoding the keys from the first two columns and then canceling them from the third to p-th columns of the array. In case of any erasures and/or error, the erasure/error decoding algorithm of EVENODD may be invoked, followed by systematic decoding. For the decoding algorith, see, e.g., M. Blaum et al., *IEEE Transactions on Computers*, 44(2):192-202 (1995). Encoding the secure EVENODD according to Construction 2 takes a total number of $4p^2-7p+1$ XORs, or on average $$4 + \frac{3}{p-2} + \frac{2}{p-1} \text{ XORs}$$

per message bit. Systematic decoding takes a total number of $2p^2-4p+1$ XORs, or on average $$2 + \frac{1}{p-2} + \frac{1}{p-1} \text{ XORs}$$

per message bit. By Corollary 1, encoding each message bit requires at least $$4 + \frac{2}{p-2} \text{ XORs.}$$

Moreover, in order to be secure against $z=2$ eavesdroppers, each message bit has to be padded by at least two keys, and different message bits must not be padded by the same pair of keys, so decoding each message bit requires at least 2 XORs. Therefore, secure EVENODD has almost optimal encoding and systematic decoding complexities.

B. Additional Schemes from EVENODD and STAR Codes

The secure RAID schemes discussed above are schemes with optimal encoding/decoding and random access complexity, which generally can tolerate $r=2$ failures and $z=2$ eavesdroppers. The length of the schemes are $n=p+2$ or $p-1$, where p is a prime number. Two natural and important questions remain open: (1) is it possible to design secure RAID schemes of more flexible lengths; and (2) is it possible to design secure RAID schemes that can tolerate more failures and eavesdroppers? In the following section, both questions are answered affirmatively.

Specifically, in this section are designed a secure RAID scheme of arbitrary length that can tolerate two failures and two eavesdropping nodes by shortening the secure EVENODD scheme described above. Shortening erasure codes with nothing more can be trivial, i.e., given an arbitrary [n,k] systematic erasure code, it is possible to directly obtain an [n-s,k-s] code of the same distance as the original code, by suppressing s information symbols in the original code and setting them to be 0. See, for example, M. Blaum et al., *IEEE Transactions on Computers*, 44:192-202 (1995). To the contrary, for secure RAID schemes, while the same shortening technique will maintain the reliability parameter r, the technique can reduce the security parameter z. Refer to Table 5 and Table 6 below for an example. Table 5 and Table 6 provide examples of "naive" shortening of a secure RAID scheme that could compromise security. However, secure EVENODD can be shown to have the desirable property that it can be flexibly shortened to arbitrary length without compromising z if the suppressed entries are carefully chosen. This property is particularly important in practice because a specific scheme implemented in a system can be easily adapted to different configurations when the number of nodes varies.

TABLE 5

| Node 1 | Node 2 | Node 3 | Node 4 |
| --- | --- | --- | --- |
| $c_1 = u$ | $c_2 = m_1 + u$ | $c_3 = m_2 + u$ | $\Sigma c_i = m_1 + m_2 + u$ |

Table 5 shows a simple scheme with $n=4$, $r=2$, $z=1$. The bit u is a message key bit and $m_1, m_2$ are message data bits. Security is achieved by one-time-pad and reliability is achieved by the parity bit.

TABLE 6

| Node 1 | Node 2 | Node 3 (suppressed) | Node 4 |
| --- | --- | --- | --- |
| $c_1 = u$ | $c_2 = m_1 + u$ | $c_3 = 0$ | $\Sigma c_i = m_1$ |

Table 6 shows a shortened scheme. The bit $c_3$ is set to be 0 (zero) and does not need to be stored. Node 3 acts as a place holder only for the purpose of encoding. The Table 6 scheme is not secure, as Node 4 can leak the message bit.

Another topic of this section is a new secure RAID scheme that can tolerate $r=3$ failures and $z=3$ eavesdroppers. The new secure scheme is XOR-based, optimal in rate, and essentially optimal in encoding/decoding and random access complexity. Specifically, encoding one bit of information on average requires approximately $r+z=6$ XORs and decoding one bit of information when no erasure occurs on average requires approximately $z=3$ XORs. The scheme is constructed from the STAR code, which is a generalization of the EVENODD code and can optimally tolerate 3 failures. See, for exmple, C. Huang and L. Xu, *USENIX Conference on File and Storage Technologies (FAST)*, pp. 197-210 (2005), for disucssion of the STAR code. The construction uses a variant of the dual code of the STAR code for security (key padding) and uses the STAR code for reliability. This pair of codes is integrated into a systematic secure RAID scheme using the framework described in, for example, W. Huang and J. Bruck, 2016 *IEEE International Symposium on Information Theory (ISIT)*, pp. 1401-1405 (July 2016), so that the scheme preserves the computational efficiency of the original codes.

VI. Shortening the Secure EVENODD Scheme

This section will address the technique for shortening the secure EVENODD scheme, as noted above.

A. Secure RAID Schemes

In an (n,k,r,z) secure RAID scheme, a message $m = (m_1, \ldots, m_k)$ of k symbols over some alphabet is encoded into n symbols such that: (1) for Reliability: m can be decoded from any subset of encoded symbols of size $\leq n-r$; (2) for Security: Any subset of encoded symbols of size $\leq z$ do not reveal information on m. Each of the n nodes then stores one encoded symbol.

The discussion below will include commentary on the encoding/decoding and random access complexity of secure RAID schemes. The encoding/decoding complexity is the computational complexity of the encoding/decoding algorithm measured in the amount of XORs. The random access complexity is the computational and communication complexity of decoding a single entry of the message m.

B. Shortened Secure EVENODD

The shortening of secure EVENODD will next be discussed. For a prime p, secure EVENODD is a (n=p+2, k=p−2, r=2, z=2) secure RAID scheme over alphabet $F_2^{p-1}$ with essentially optimal computational and random access complexity. See, e.g., W. Huang and J. Bruck, 2016 *IEEE International Symposium on Information Theory (ISIT)*, pp. 1401-1405 (July 2016). While the length of the secure EVENODD is restricted to p+2, in practice it is often desirable to obtain schemes with arbitrary length n. For erasure codes, this goal is achieved by the technique of shortening. As mentioned previously, for secure RAID schemes, while the shortening technique will maintain the reliability parameter r, it can also reduce the security parameter z. However, in this discussion, it is shown that secure EVENODD has the desirable property that it can be flexibly shortened without compromising z. Namely, from a (p+2, p−2,2,2) secure EVENODD scheme, one can obtain a (p+2−s, p−2−s,2,2) scheme for any 0≤s<p.

For this discussion, begin with an algebraic description of secure EVENODD. Let p be a prime number, and let $M_p(x)=\Sigma_{i=0}^{p-1} x^i$ be a polynomial over GF(2). Let $R_p$ be the ring of polynomials of degree less than p−1 over GF(2) with multiplication taken modulo $M_p(x)$. Use the indeterminate α instead of x to refer to polynomials in $R_p$. Note that the multiplicative order of α is p, i.e., $\alpha^p=1$, and therefore ring elements of the form $\alpha^i$ always has a multiplicative inverse $\alpha^{p-i}$, also denoted by $\alpha^{-i}$. It is observed that $R_p$ is a field if and only if 2 is a primitive element in GF (p). See, e.g., M. Blaum et al., *IEEE Transactions on Information Theory*, 42(2):529-542 (1996). In this discussion, the case that $R_p$ is indeed a field will be examined. Throughout this discussion, denote {1, . . . , n} by [n]. These considerations lead to Construction 3 below.

Construction 3

(Secure EVENODD). Let $u_1(\alpha)$, $u_2(\alpha)$ be two key polynomials selected i.i.d. uniformly at random from $R_p$, and let $m_i(\alpha)$, i∈[p−2] be the message polynomials (each representing p−1 bits of information). The key and message polynomials are encoded into p+2 codeword polynomials $c_i(\alpha)$, such that $c_i(\alpha)$ represents the p−1 bits to be stored on the i-th node. Then $(c_1(\alpha), . . . , c_{p+2}(\alpha))=(u_1(\alpha), u_2(\alpha), m_1(\alpha), . . . , m_{p-2}(\alpha)) G_{pad} G_{EO}$, where $G_{pad}$ is a square matrix that pads the key polynomials to the message polynomials, and $G_{EO}$ is the generator matrix for the EVENODD code. More specifically, $$G_{pad} = \begin{pmatrix} 1 & 1 & 1 & \cdots & 1 \\ 0 & \alpha & \alpha^2 & \cdots & \alpha^{p-1} \\ 0 & 0 & 1 & \cdots & 0 \\ \vdots & \vdots & \vdots & \ddots & \vdots \\ 0 & 0 & 0 & \cdots & 1 \end{pmatrix} \quad (1)$$

and $$G_{EO} = \begin{pmatrix} 1 & 0 & \cdots & 0 & 1 & 1 \\ 0 & 1 & \cdots & 0 & 1 & \alpha \\ \vdots & \vdots & \ddots & \vdots & \vdots & \vdots \\ 0 & 0 & \cdots & 1 & 1 & \alpha^{p-1} \end{pmatrix}. \quad (2)$$

The discussion above leads to Construction 4.

Construction 4

(Shortened Secure EVENODD). Let 0≤s≤p−2 be an integer. The shortened secure EVENODD of length p+2−s and dimension p−2−s is encoded by $(u_1(\alpha), u_2(\alpha), m_1(\alpha), . . . , m_{p-2-s}(\alpha)) G_{pad}' G_{EO}'$, where $u_1(\alpha)$, $u_2(\alpha)$ are randomly selected key polynomials, $m_1(\alpha), . . . , m_{p-2-s}(\alpha)$ are the message polynomials, and $G_{pad}'$ is obtained by deleting the third to (s+2)-throws and columns from $G_{pad}$, and $G_{EO}'$ is obtained by deleting the third to (s+2)-throws and columns from $G_{EO}$.

It should be noted that the length and dimension of the shortened secure EVENODD is decreased by s compared to the secure EVENODD. Also note that by deleting the rows and columns from the matrices, essentially the third to (s+2)-th entries are suppressed in the codeword of Construction 1 to be 0. The following theorem, which is followed by its proof, shows that the shortened secure EVENODD maintains the security parameter z.

Theorem 6.

If $R_p$ is a field, then the shortened secure EVENODD is a (p+2−s,p−2−s,2,2) secure RAID scheme. Particularly, the scheme has optimal rate.

Proof.

It is known that the scheme is rate-optimal if it indeed tolerates two erasures and two eavesdroppers. See, e.g., W. Huang et al., *Theory*, 62(12): 7195-7206 (2016), Proposition 1. It can be seen that the shortened scheme maintains the same level of reliability as secure EVENODD, and can tolerate any two erasures. Particularly, the same decoding algorithm can be used, except that the shortened (suppressed) entries in the codeword are set to be 0 by default. It may also be shown that the shortened scheme is also secure in the presence of two eavesdropping nodes.

By the well-known security lemma (e.g., R. Bitar and S. El Rouayheb, arXiv:1512.02990 (2016), Appendix 7), the scheme is secure if and only if the following claim is true: let $c_{i_1}(\alpha),c_{i_2}(\alpha)$ be any two entries of the shortened codeword, then $u_1(\alpha)$ and $u_2(\alpha)$ are functions of $c_{i_1}(\alpha),c_{i_2}(\alpha)$ and $m_i(\alpha)$, i=1, . . . , p−2−s. To prove the claim, the claim is reformulated in the context of Construction 1. Note that encoding Construction 2 is equivalent to encoding Construction 1 and suppressing the third to (s+2)-th entries in the codeword to be 0. Therefore, let S={3,4, . . . , s+2} be the index set of the shortened entries, then an equivalent claim is: in Construction 1, for any $i_1,i_2$ ∈[p+2]\S, $u_1(\alpha)$ and $u_2(\alpha)$ are functions of $c_{i_1}(\alpha),c_{i_2}(\alpha)$, {$c_i(\alpha)$: i∈S}, and $m_i(\alpha)$, i∈[p−2]\S. In the following, this claim is proved by showing that one can recover $u_1(\alpha)$ and $u_2(\alpha)$ from $c_{i_1}(\alpha),c_{i_2}(\alpha)$, {$c_i(\alpha)$: i∈S}, and $m_i(\alpha)$, i∈[p−2]\S. Note that the generator matrix of Construction 1 is $$G_{pad}G_{EO} = \begin{pmatrix} 1 & 1 & 1 & \cdots & 1 & 1 & 0 \\ 0 & \alpha & \alpha^2 & \cdots & \alpha^{p-1} & 1 & 1 \\ 0 & 0 & 1 & \cdots & 0 & 1 & \alpha^2 \\ \vdots & \vdots & \vdots & \ddots & \vdots & \vdots & \vdots \\ 0 & 0 & 0 & \cdots & 1 & 1 & \alpha^{p-1} \end{pmatrix}. \quad (3)$$

The next operation is to remove the rows corresponding to the message polynomials $m_i(\alpha)$, i∈[p−2]\S, namely the (3+s)-th to the (p−2)-th rows from Equation (3) above to obtain a matrix, denoted by $G_s$:

$$\begin{pmatrix} 1 & 1 & 1 & \ldots & 1 & 1 & \ldots & 1 & 1 & 0 \\ 0 & \alpha & \alpha^2 & \ldots & \alpha^{s+1} & \alpha^{s+2} & \ldots & \alpha^{p-1} & 1 & 1 \\ 0 & 0 & 1 & \ldots & 0 & 0 & \ldots & 0 & 1 & \alpha^2 \\ \vdots & \vdots & \vdots & \ddots & \vdots & \vdots & \vdots & \vdots & \vdots & \vdots \\ 0 & 0 & 0 & \ldots & 1 & 0 & \ldots & 0 & 1 & \alpha^{s+1} \end{pmatrix}.$$

It then suffices to show that column vectors $e_1 = (1,0,\ldots,0)$ and $e_2 = (0,1,0,\ldots,0)$ are in the column span of the space generated by the third to $(s+2)$-th columns plus the $i_1$-th and $i_2$-th columns of $G_s$. If both the $i_1$-th and $i_2$-th columns are not the last two columns of $G_s$, then since $R_p$ is a field, the $i_1$-th and $i_2$-th columns span $e_1$ and $e_2$. In the remaining part of the proof, the cases are examined where at least one of $i_1$ and $i_2$ is equal to $p+1$ or $p+2$. The case that s is odd is distinguished from the case that it is even. First, the case that s is odd will be addressed.

Case 1 ($i_1 = p+1, i_2 < p+1$): sum the 3-rd to $(s+2)$-th columns and the $i_1$-th column to obtain $u = (0,1 = \Sigma_{i=2}^{s+1} \alpha^i, 0, \ldots, 0)$. This vector together with the $i_2$-th column span $e_1, e_2$.

Case 2 ($i_1 = p+2, i_2 < p+1$): for $i = 3, \ldots, s+2$, scale the i-th column by $\alpha^{i-1}$ and add it to the $i_1$-th column to obtain the vector $v = (\Sigma_{j=2}^{s+1} \alpha^j, 1 + \Sigma_{j=2}^{s+1} \alpha^{2j}, 0, \ldots, 0)$. Now if $i_2 = 1$, then clearly v and the first column spans $e_1, e_2$. Otherwise, scale the $i_2$-th column by $\Sigma_{j=2}^{s+1} \alpha^j$ and add to v to obtain $(0, 1 + \Sigma_{j=2}^{s+1} \alpha^{j+i_2-1} + \Sigma_{j=2}^{s+1} \alpha^{2j}, 0, \ldots, 0)$. It is only needed to show that $$\rho = 1 + \sum_{j=2}^{s+1} \alpha^{j+i_2-1} + \sum_{j=2}^{s+1} \alpha^{2j} \neq 0. \quad (4)$$

Note that $\alpha^p = 1$ and (4) is trivially true when $s=1$ or $p=5$. Next, Equation (4) is proved assuming $p > 5$ and $s > 1$. First suppose that $$s \leq \frac{p+3}{2}$$

so that the summation $\Sigma_{j=2}^{s+1} \alpha^{2j}$ includes $\alpha^4, \alpha^6$ but does not include $\alpha^5$. $\Sigma_{j=2}^{s+1} \alpha^{j+i_2-1}$, however, sums consecutive powers of $\alpha$ and therefore if it includes $\alpha^5$, then it must inlcude either $\alpha^4$ or $\alpha^6$ or both. Therefore $\rho$ must either 1) includes both $\alpha^4$ and $\alpha^6$ but does not include $\alpha^5$, or 2) includes $a^5$ but does not include at least one of $\alpha^4$ and $\alpha^6$. In both cases $\rho$ is not zero. Now suppose that $$s > \frac{p+3}{2},$$

then $\Sigma_{j=2}^{s+1} \alpha^{2j}$ includes $\alpha^1, \alpha^3$ but does not include $\alpha^2$. By the same argument as above again it follows that $\rho \neq 0$. This proves (4) and so v and the $i_2$-th column span $e_1, e_2$.

Case 3 ($i_1 = p+1, i_2 = p+2$): obtain u as in Case 1 and obtain v as in Case 2. Then u, v span $e_1, e_2$.

Next to be addressed is the case where s is even. The three cases to be discussed for the s is even situation will be differentiated from the s is odd situation by an apostrophe (').

Case 1' ($i_1 = p+1, i_2 < p+1$): sum the third to $(s+2)$-th columns and the $i_1$-th column to obtain $u' = (1, 1+\Sigma_{i=2}^{s+1} \alpha^i, 0, \ldots, 0)$. This vector together with the $i_2$-th column spans $e_1, e_2$.

Case 2' ($i_1 = p+2, i_2 < p+1$): the proof is identical to the proof of Case 2 above.

Case 3' ($i_1 = p+1, i_2 = p+2$): Obtain u' as in Case 1'. Add u' to the j-th column to obtain $$w_j = \left(0, 1 + \sum_{\substack{k=2 \\ k \neq j-1}}^{s+1} \alpha^k, 0, \ldots, 1, \ldots, 0\right), j = 3, \ldots, s+2 \quad (5)$$

where the entry of 1 is the j-th entry. Now scale $w_j$ by $\alpha^{j-1}$ and sum all of them to the $(p+2)$-th column to obtain:

$$v' = \left(0, 1 + \sum_{k=2}^{s+1}\left(\alpha^k\left(1 + \sum_{l=2, l\neq k}^{s+1} \alpha^l\right)\right), 0, \ldots, 0\right) \quad (6)$$

$$= \left(0, 1 + \sum_{k=2}^{s+1} \alpha^k, 0, \ldots, 0\right). \quad (7)$$

Note that u',v' span $e_1, e_2$. This proves the final case and the theorem (Theorem 6).

C. Secure STAR

The secure RAID schemes such as proposed in W. Huang et al., *Theory*, 62(12): 7195-7206 (2016), including the secure EVENODD discussed above, are designed to tolerate $r \leq 2$ erasures and $z \leq 2$ eavesdroppers. A natural and important question is how to construct secure RAID schemes that can tolerate more erasures and eavesroppers. In this section an efficient secure RAID scheme is constructed based on the STAR code, which is a generalization of the EVENODD code. The STAR code is discussed in, for example, C. Huang and L. Xu, *USENIX Conference on File and Storage Technologies (FAST)*, pp. 197-210 (2005). The STAR code is a family of MDS array codes capable of tolerating three erasrues with almost optimal encoding complexity. The resulting secure RAID scheme can tolerate $r \leq 3$ erasures and $z \leq 3$ eavesdroppers, with almost optimal encoding and decoding complexity and with efficient random access compleixty. First, the STAR code in accordance with this disclosure will be described. Recall that $M_p(x) = \Sigma_{i=0}^{p-1} x^i$ is a polynomial over GF(2), and that $R_p$ is the ring of polynomials of degree less than $p-1$ over GF(2) with multiplication taken modulo $M_p(x)$, and that the indeterminate $\alpha$ is used instead of x to refer to polynomials in $R_p$. Construction 5 is obtained.

Construction 5

(STAR code). Let p be a prime number, the STAR code is a [p+3,p] MDS array code over $F_2^{p-1}$. Specifically, let $m_1(\alpha), \ldots, m_p(\alpha)$ be p message polynomials each representing p−1 message bits. Then the codeword polynomials $(c_1(\alpha), \ldots, c_{p+3}(\alpha)) = (m_1(\beta), \ldots, m_p(\alpha)) G_{STAR}$, where $G_{STAR}$ is the generator matrix of the STAR code:

$$G_{STAR} = \begin{pmatrix} 1 & 0 & \ldots & 0 & 1 & 1 & 1 \\ 0 & 1 & \ldots & 0 & 1 & \alpha & \alpha^{-1} \\ \vdots & \vdots & \ddots & \vdots & \vdots & \vdots & \vdots \\ 0 & 0 & \ldots & 1 & 1 & \alpha^{p-1} & \alpha^{-(p-1)} \end{pmatrix}. \quad (8)$$

As noted above, a STAR code discussion may be found in C. Huang and L. Xu, *USENIX Conference on File and*

*Storage Technologies (FAST)*, pp. 197-210 (2005). The secure STAR scheme will now be described, in Construction 6.

Construction 6

(Secure STAR). Let $u_1(\alpha), u_2(\alpha), u_3(\alpha)$ be three key polynomials selected i.i.d. uniformly at random from $R_p$, and let $m_i(\alpha)$, $i \in [p-3]$ be the message polynomials (each representing p−1 bits of information). The key and message polynomials are encoded into p+3 codeword polynomials $c_i(\alpha)$, such that $c_i(\alpha)$ represents the p−1 bits to be stored on the i-th node. Then $(c_1(\alpha), \ldots, c_{p+3}(\alpha)) = (u_1(\alpha), u_3(\alpha), m_1(\alpha), \ldots, m_{p-3}(\alpha)) G''_{pad} G_{STAR}$, where $G''_{pad}$, defined in (9), is a square matrix that pad the key polynomials to the message polynomials, and $G_{STAR}$, defined in (8), is the generator matrix for the STAR code.

$$G''_{pad} = \begin{pmatrix} 1 & 1 & 1 & \ldots & 1 & 1 \\ 1 & \alpha & \alpha^2 & \ldots & \alpha^{p-1} & \alpha^{p-1} \\ 1 & \alpha^{-1} & \alpha^{-2} & \ldots & \alpha^{-(p-2)} & \alpha^{-(p-1)} \\ 0 & 0 & 1 & \ldots & 0 & 0 \\ \vdots & \vdots & \vdots & \ddots & \vdots & \vdots \\ 0 & 0 & 0 & \ldots & 1 & 0 \end{pmatrix} \quad (9)$$

The following result of Theorem 2 shows that secure STAR is a valid secure RAID scheme. The statement of Theorem 2 is followed by its proof.

Theorem 7.

The secure STAR is a (n=p+3, k=p−3, r=3, z=3) secure RAID scheme over $F_2^{p-1}$. Particularly, the scheme has optimal rate.

Proof.

By W. Huang et al., *Theory*, 62(12): 7195-7206 (2016), at Proposition 1, the scheme is rate-optimal if it tolerates three erasures and three eavesdroppers. Because the STAR code can tolerate three erasures and the codewords of secure STAR are codewords of the STAR code by construction, it follows that secure STAR can tolerate three erasures. It remains to be shown that the scheme can also tolerate three eavesdropping nodes. By the well-known security lemma (e.g., R. Bitar and S. El Rouayheb, arXiv:1512.02990 (2016), at Appendix 7), it suffices to show that from any three entries of the codeword $c_{i_1}(\alpha), c_{i_2}(\alpha), c_{i_3}(\alpha)$ and $m_i(\alpha)$, i=1, ..., p−3, one can recover $u_1(\alpha), u_2(\alpha)$ and $u_3(\alpha)$. To prove this claim, note that the generator matrix of secure STAR is $G''_{pad} G_{STAR} =$ $$\begin{pmatrix} 1 & 1 & 1 & \ldots & 1 & 1 & 1 & 0 & 0 \\ 1 & \alpha & \alpha^2 & \ldots & \alpha^{p-2} & \alpha^{p-1} & 0 & 0 & 1 \\ 1 & \alpha^{-1} & \alpha^{-2} & \ldots & \alpha^{-(p-2)} & \alpha^{-(p-1)} & 0 & 1 & 0 \\ 0 & 0 & 1 & \ldots & 0 & 0 & 1 & \alpha^2 & \alpha^{-2} \\ \vdots & \vdots & \vdots & \ddots & \vdots & \vdots & \vdots & \vdots & \vdots \\ 0 & 0 & 0 & \ldots & 1 & 0 & 1 & \alpha^{p-2} & \alpha^{-(p-2)} \end{pmatrix} \quad (10)$$

Let $G_{top}$ be the matrix formed by the first three rows of the matrix in Equation (10) above, then $G_{top}$ is a systematic parity check matrix of the STAR code if the (p+2)-th and (p+3)-th columns are swapped. Because the STAR code is MDS, any three columns of its parity check matrix are linearly independent. Therefore any three columns of $G_{top}$ are linearly independent. This proves the claim and the theorem.

1. Encoding Secure STAR

The complexity of the secure STAR scheme is examined next. Consider the operation of multiplying a polynomial $f(\alpha) = \sum_{i=0}^{p-2} f_i \alpha^i$ by $\alpha^j$. Then the resulting polynomial is $$\alpha^j f(\alpha) = \sum_{\substack{i=0 \\ \langle i+j \rangle \neq p-1}}^{p-2} f_i \alpha^{\langle i+j \rangle} + \sum_{i=0}^{p-2} f_{p-1-j} \alpha^i \quad (11)$$

where $f_{p-1} = 0$ is defined. Note that the first summation in Equation (11) above is simply a cyclic shift of $f(\alpha)$ except that the (p−1−j)-th entry becomes 0. Therefore the multiplication in Equation (11) takes at most p−1 XORs to compute. Consider the encoding complexity of secure STAR, in the first phase the key and message polynomials are multiplied by $G_{pad}$. This takes at most $10(p-1)+5(p-3)(p-1)$ XORs. The second phase, which is to encode the standard STAR code, takes at most $3(p-1)^2 + 2(p-2)$ XORs. Therefore the normalized encoding complexity of secure STAR is $$\frac{10(p-1) + 5(p-3)(p-1) + 3(p-1)^2 + 2(p-2)}{(p-3)(p-1)} \approx 8$$

XORs to encode each bit of message. By publications such as W. Huang and J. Bruck, 2016 *IEEE International Symposium on Information Theory (ISIT)*, pp. 1401-1405 (July 2016), at Corollary 1, a lower bound on the normalized encoding complexity is $$6 + \frac{6}{p-3} \approx 6 \; XORs$$

to encode each message bit. Therefore the encoding complexity of secure STAR is almost optimal. In the following we show an improved encoding scheme of secure STAR to further reduce the encoding complexity. The normalized encoding complexity of the improved scheme converges to 6 XORs as p grows, i.e., it is asymptotically optimal.

More specifically, consider the (binary) generator matrix of the STAR code by regarding a polynomial $f(\alpha)$ as a binary row vector of length p−1. And so the generator matrix in (8) expand into a p(p−1) by (p+3)(p−1) binary matrix, i.e., each entry in the matrix in (10) expands into a (p−1) by (p−1) block:

$$G'_{STAR} = \begin{pmatrix} I & 0 & \cdots & 0 & I & A_0 & A_0 \\ 0 & I & \cdots & 0 & I & A_1 & A_{\langle -1 \rangle} \\ \vdots & \vdots & \ddots & \vdots & \vdots & \vdots & \vdots \\ 0 & 0 & \cdots & I & I & A_{p-1} & A_{\langle -(p-1) \rangle} \end{pmatrix}, \quad (12)$$

where I is the identity matrix of order p−1, 0 is the square zero matrix of order p−1, $\langle \cdot \rangle$ is the modulo p operator, and $A_k = (a_{ij}^{(k)})$, $1 \leq i, j \leq p-1$ is defined by:

$$a_{ij}^{(k)} = \begin{cases} 1, & j-i = k \text{ or } i = p-k \\ 0, & \text{otherwise} \end{cases} \quad (13)$$

For example, $A_0 = I$, and for p=5:

$$A_1 = \begin{pmatrix} 0 & 1 & 0 & 0 \\ 0 & 0 & 1 & 0 \\ 0 & 0 & 0 & 1 \\ 1 & 1 & 1 & 1 \end{pmatrix}, A_2 = \begin{pmatrix} 0 & 0 & 1 & 0 \\ 0 & 0 & 0 & 1 \\ 1 & 1 & 1 & 1 \\ 1 & 0 & 0 & 0 \end{pmatrix} \quad (14)$$

Therefore, the binary parity check matrix corresponding to the systematic generator matrix in Equation (12) above is:

$$H'_{STAR} = \begin{pmatrix} I & I & \cdots & I & I & 0 & 0 \\ A_0^t & A_1^t & \cdots & A_{p-1}^t & 0 & I & 0 \\ A_0^t & A_{\langle-1\rangle}^t & \cdots & A_{\langle-p-1\rangle}^t & 0 & 0 & I \end{pmatrix}.$$

Complexity is reduced from what it might otherwise be, in accordance with this technique. Consider the complexity of encoding the dual code of the STAR code by multiplying a message vector ($u_1$, $u_2$, $u_3$) with the matrix $H_{STAR}'$, where $u_i$ is a binary row vector of length p−1. Then multiplying $u_i$ with $A_j^t$ is simply a cyclic shift of $u_i$ (by j entries to the left) except that the (p−j)-th entry in the result becomes $u^*_i = \Sigma_{k=1}^{p-1} u_{ik}$. Therefore the only computation required in multiplying $u_i$ with $A_j^t$ is to compute $u^*_i$, which only needs to be performed once for each $u_i$.

To encode secure STAR, instead of using the padding matrix $G''_{pad}$ in (9), use the following matrix $G''_{pad2}$:

$$\begin{pmatrix} I & I & I & \cdots & I & I \\ A_0^t & A_1^t & A_2^t & \cdots & A_{p-2}^t & A_{p-1}^t \\ A_0^t & A_{\langle-1\rangle}^t & A_{\langle-2\rangle}^t & \cdots & A_{\langle-(p-2)\rangle}^t & A_{\langle-(p-1)\rangle}^t \\ 0 & 0 & I & \cdots & 0 & 0 \\ \vdots & \vdots & \vdots & \ddots & \vdots & 0 \\ 0 & 0 & 0 & \cdots & I & 0 \end{pmatrix} \quad (15)$$

Note that replacing $G''_{pad}$ by $G''_{pad2}$ does not affect the security of the scheme. This is because the first three rows of $G''_{pad}$ and of $G''_{pad2}$ span the same space, i.e., the space of the dual code of the STAR code, with the last three entries in the codeword deleted.

The improved padding matrix reduces the encoding complexity of the padding phase to at most 2(p−2)+6(p−1)+3(p−3)(p−1) XORs. Therefore, the overall normalized encoding complexity of the improved scheme is $$\frac{4(p-2)+6(p-1)+3(p-3)(p-1)+3(p-1)^2}{(p-1)(p-3)} \approx 6$$

XORs per message bit. Particularly, this complexity is asymptotically optimal.

2. Decoding Secure STAR

Next, consider the decoding complexity of secure STAR. Note that in general one can decode by multiplying the codeword vector to the inverse of the generator matrix, but matrix inversion is an expensive operation (requiring $O(n^6)$ XORs). Even if the cost of matrix inversion is amortized (as the inverse can be pre-computed), matrix multiplication is still expensive (requiring $O(n^4)$ XORs). In the following discussion, the construction of secure STAR is shown to entail a very efficient decoding algorithm, requiring only $O(n^2)$ XORs in total.

The decoding algorithm can be divided into three steps: First, if any of the first p entries in the codeword is erased, recover them by erasure decoding. Secondly, decode the key polynomials $u_1(\alpha), u_2(\alpha), u_3(\alpha)$ and hence all the key bits from $c_1(\alpha), c_2(\alpha), c_p(\alpha)$. Finally, cancel the keys from $c_i(\alpha)$, i=3, . . . , p−1 to obtain the message polynomials. For the first step, since the codewords of secure STAR are codewords of the STAR code, recovering the erased symbols is equivalent to recovering from erasures in the STAR code. A major advantage of the STAR code is that it has a very efficient erasure decoding algorithm, requiring at most $O(n^2)$ XORs to recover any three erasures. See, e.g., C. Huang and L. Xu, *USENIX Conference on File and Storage Technologies (FAST)*, pp. 197-210 (2005). In the following, the latter two steps are discussed further, which deal with the arguably more important issue of "decrypting" the message, as erasure decoding is needed only when erasures have occurred, but "decryption" is always needed whenever one wants to retrieve the encoded information.

First, the third step of canceling the keys is described, which is simply to "re-pad" the keys to the codeword in the same way as how they are padded during the encoding phase. Since the padding scheme of Equation (15) above is almost optimal, i.e., most entries in the array are padded by only three key bits, the minimum number of keys to tolerate three eavesdroppers, the complexity of canceling the keys is also almost optimal. Namely, for most entries in the array, recovering the message bit stored in that entry only require three XORs to cancel the keys.

Next, the second step of decoding the key polynomials is described. For the ease of notation, denote for short $a_i @ u_{1i}$, $b_i @ u_{2i}$, $c_i @ u_{3i}$, i=1, . . . , p−1, and $a_0 @ u^*_1$, $b_0 @ u^*_2$, $c_0 @ u^*_3$ (recall that $u^*_j = \Sigma_{i=1}^{p-1} u_{ji}$). Then the coefficients of $c_1(\alpha)$ are $a_i + b_i c_i$, the coefficients of $c_2(\alpha)$ are $a_i + b_{\langle i+1\rangle} + c_{\langle i-1\rangle}$ and the coefficients of $c_p(\alpha)$ are $a_i + b_{\langle i-1\rangle} + c_{\langle i+1\rangle}$, i=1, . . . , p−1. Therefore the coefficients of $c_1(\alpha)+c_2(\alpha)$ are $u_i @ b_i + b_{\langle i+1\rangle} + c_{\langle i-1\rangle} + c_i$, and the coefficients of $c_1(\alpha)+c_p(\alpha)$ are $v_i @ b_{\langle i-1\rangle} + b_i + c_i + c_{\langle i+1\rangle}$, i=1, . . . , p−1.

For i=0, . . . , p−3, by XORing $v_{\langle i+1\rangle}$ and $u_{\langle i+2\rangle}$ the term $w_i = b_i + b_{\langle i+1\rangle} + b_{\langle i+2\rangle} + b_{\langle i+3\rangle}$ is obtained. Since $b_0 = u^*_2 = \Sigma_{i=1}^{p-1} b_i$, we have $w_0 = \Sigma_{i=4}^{p-1} b_i$, and $w_{p-3} = \Sigma_{i=1}^{p-4} b_i$. Next, consider two cases: Case 1: p mod 4=1. Therefore 4 divides p−5 and the $w_i$'s can be combined to obtain $\Sigma_{i=5}^{p-1} b_i$. Canceling it from $w_0$, the $b_4$ is obtained. Similarly, four divides p−9 and so $\Sigma_{i=6}^{p-4} b_i$ is obtained. Canceling $\Sigma_{i=6}^{p-4} b_i$ and $w_1$ from $w_{p-3}$, the $b_5$ is obtained. By symmetry, $c_4$ and $c_5$ can be obtained. Case 2: p mod 4=3. Therefore, four divides p−3 and the $w_i$'s can be combined to obtain $\Sigma_{i=3}^{p-1} b_i$. Canceling it from $w_0$ the $b_3$ is obtained. Similarly, four divides p−7 and $\Sigma_{i=4}^{p-4} b_i$ can be obtained. Canceling it from $w_{p-3}$ the $b_1 + b_2 + b_3$ is obtained. Finally, canceling it from $w_1$ the $b_4$ is obtained. By symmetry $c_3$ and $c_4$ are also obtained.

Therefore, there always exists an i so that $b_i$, $b_{i+1}$ and $c_{i+1}$ can be obtained. Then, cancel $b_i$, $c_i$ and $c_{i+1}$ from $v_i$ and then obtain $b_{i-1}$. Cancel $b_{i+1}$, $c_i$ and from $u_{i+1}$ and then obtain $b_{i+2}$. By symmetry $c_{i-1}$ and $c_{i+2}$ are also obtained. By induction, obtain all $b_i$, $c_i$, i=1, . . . , p−1. Finally, cancel the $b_i$'s and the $c_i$'s from the coefficients of $c_1(\alpha)$ and then obtain $a_i$, i=1, . . . , p. This completes the decoding of all key bits.

The computational complexity of the decoding algorithm can be summarized for when no erasure occurs, i.e., the complexity of the second and third steps of the algorithm. The second step requires no more than 18 (p−1) XORs and the third step requires no more than $3(p-1)+3(p-3)(p-1)$ XORs. Therefore the normalized decoding complexity is $$\frac{18(p-1)+3(p-1)+3(p-3)(p-1)}{(p-3)(p-1)} \approx 3$$

XORs per message bit. Since every message bit has to be padded by at least three keys in order to tolerate three eavesdropping nodes, the decoding complexity of the scheme is asymptotically optimal.

VII. Secure RAID From B Codes

Next to be constructed is a family of low-complexity XOR-based secure RAID schemes from the B codes. For background information, see L. Xu et al., *IEEE Transactions on Information Theory*, 45(6):1817-1826 (1999). Similar as before, it is shown that the density of the generator matrix of the scheme approaches the lower bound in Theorem 2, and that the scheme is almost optimal in terms of encoding complexity and systematic decoding complexity.

It should be noted that the B codes are equivalent to perfect one-factorization of complete graphs. See, e.g., L. Xu et al., *IEEE Transactions on Information Theory*, 45(6): 1817-1826 (1999). For any prime p, the perfect one-factorization of $K_{p+1}$, the complete graph of p+1 vertexes, is known. See, e.g., W. D. Wallis, *One-Factorizations*, Norwell (1997). As such, the graph of vertexes geometrically defines a family of B codes, also equivalent to the codes such as in, for example, G. Zaitsev et al., *Probl. Inform. Transm.*, 19(3):197-204 (1983). A simplified algebraic description of this family of B codes is presented herein. The algebraic description is useful in later constructions.

Starting with the dual B codes, which are conceptually simpler, it is defined that, for any prime p, let $$t = \frac{p-1}{2},$$

the dual B code is a [p-1,2] MDS array code over $F_2^t$ of minimum distance p-2. Refer to FIG. 3 for an example of the dual B code of p=7 and an informal description of the construction. Let a,b be integers, denote by $$\left\langle \frac{a}{b} \right\rangle$$

by the unique integer m, $0 \leq m < p$, such that a=bm (mod p).

Table 5 below shows a Dual B code of length 6.

TABLE 5

| Node 1 | Node 2 | Node 3 | Node 4 | Node 5 | Node 6 |
|---|---|---|---|---|---|
| $m_1$ | $m_2$ | $m_3$ | $m_4$ | $m_5$ | $m_6$ |
| $m_2 \oplus m_6$ | $m_4 \oplus m_5$ | $m_6 \oplus m_4$ | $m_1 \oplus m_3$ | $m_3 \oplus m_2$ | $m_5 \oplus m_1$ |
| $m_3 \oplus m_5$ | $m_6 \oplus m_3$ | $m_2 \oplus m_1$ | $m_5 \oplus m_6$ | $m_1 \oplus m_4$ | $m_4 \oplus m_2$ |

For the Dual B code of Table 5, all symbols are binary bits and all operations are XORs. The code is MDS and is able to correct 6-2=4 node (column) erasures. Note that each message bit is checked by exactly four parities, implying optimal encoding complexity because this is necessary to correct four erasures. In general, Dual B codes with similar properties can be constructed for any length p-1, where p is prime, in the following simple way: node i stores $m_i$ as well as all sums of the form $m_a \oplus m_b$ such that $\langle a+b \rangle = i$. Such codes can be constructed with the help of Construction 7:

Construction 7

(Dual B Code). Let p be a prime, $$t = \frac{p-1}{2}$$

and let $m_1, \ldots, m_{p-1}$ be the message bits. The codewords of the dual B code forms a t×(p-1) array, described by the following encoding mapping. The first row of the array consists of the systematic symbols, i.e., $c_{1,j}=m_j$, for j= 1, ..., p-1. The 2-nd to t-th rows are redundant symbols, i.e., $c_{i,j} = m_{\langle i \cdot j \rangle} \oplus m_{\langle (1-i) \cdot j \rangle}$, for i=2, ..., t, j=1, ..., p-1.

A characteristic of such a construction is noted by Theorem 8 below, whose proof follows.

Theorem 8.

The dual B codes in Construction 3 are MDS.

Proof.

Note that the dual B codes have dimension k=2 because there are p-1 message bits and $$t = \frac{p-1}{2}.$$

Therefore it suffices to prove that all message bits can be decoded from any two nodes. Suppose the two nodes are node u and v. To simplify the presentation, assume that there is an extra bit $m_0$ which is fixed to 0. Then by construction, for x=u,v, node x stores $\{m_a + m_b | a+b=x, 0 \leq a,b \leq p-1\}$. Let i=u/2 and j=v/2, where the division is over $F_p$. Next, describe a path in which vertexes represent the indexes of the message bits, and edges represent the encoded bits stored in either node u or v, i.e., the edge (a,b) represents $m_a+m_b$. The path consists of p vertexes $x_1, \ldots, x_p$ and p-1 edges, defined as follows. Let the first vertex be $x_1=i$. Let the odd edges (i.e., the 1st, 3rd, ..., (p-2)-th edges) come from node v, i.e., they are elements of $\{(a,b)|a+b=v=2j\}$, and let the even edges come from node u, i.e., they are elements of $\{(a,b) |a+b=u=2i\}$. For example $x_2=2j-i$, since node v stores $m_i+m_{2j-i}$ and stores no other encoded bits involving $m_i$; and $x_3=3i-2j$, since node u stores $m_{2j-i}+m_{3i-2j}$ and stores no other encoded bits involving $m_{2j-i}$. By induction, it is substantially straightforward to see that $$\{x_1, \ldots, x_p\} = \left\{ i + 2a(i-j) \mid a = 0, \pm 1, \ldots, \pm \frac{p-1}{2} \right\}.$$

As part of the proof, it is claimed that the path is simple, i.e., $|\{x_1, \ldots, x_p\}|=p$. Suppose $i+2a(i-j)=i+2a'(i-j)$, then because $i \neq j$, it follows that a=a', proving the claim. Next, because $F_p$ has exactly p elements, it follows that $\{x_1, \ldots, x_p\}=\{0, \ldots, p-1\}$. More particularly, the path contains a vertex labeled by 0, whose neighbors on the path are vertexes u and v. Cut the path at the vertex 0, obtaining two decoding paths, where one starts with vertex u, and the other starts with vertex v. Following the decoding paths, all message bits on the path can be decoded one by one through cancellation, starting with canceling $m_u$ and $m_v$ which are stored in the clear. This completes the proof.

Thus, desired ease of complexity is provided with dual B codes that are MDS. In the 2t×(p−1)t generator matrix of the dual B code, each row has exactly p−2 1's. This meets the obvious lower bound on the number of 1's (the dual B code has minimum distance p−2), and therefore the dual B code has a lowest density generator matrix. This matrix is a (systematic) parity check matrix of the B code, from which one can immediately obtain a generator matrix of the B code, by recalling that $[A\ I_{rt}]$ is a parity-check matrix of an $[n,k=n-r]$ code C over $F_q^t$ if and only if $[I_{kt}-A^T]$ is a generator matrix of C. Table 6 below provides an example of the B code of p=7 and the accompanying text provides an informal description of the construction. An example of a B code construction technique is provided by Construction 4, below.

TABLE 6

| Node 1 | Node 2 | Node 3 | Node 4 | Node 5 | Node 6 |
|---|---|---|---|---|---|
| $m_{1,1}$ | $m_{1,2}$ | $m_{1,3}$ | $m_{1,4}$ | $m_{1,5}$ | $m_{1,6}$ |
| $m_{2,1}$ | $m_{2,2}$ | $m_{2,3}$ | $m_{2,4}$ | $m_{2,5}$ | $m_{2,6}$ |
| $m_{1,4} \oplus m_{1,6} \oplus m_{2,5} \oplus m_{2,3}$ | $m_{1,1} \oplus m_{1,5} \oplus m_{2,3} \oplus m_{2,6}$ | $m_{1,5} \oplus m_{1,4} \oplus m_{2,1} \oplus m_{2,2}$ | $m_{1,2} \oplus m_{1,3} \oplus m_{2,6} \oplus m_{2,5}$ | $m_{1,6} \oplus m_{1,2} \oplus m_{2,4} \oplus m_{2,1}$ | $m_{1,3} \oplus m_{1,1} \oplus m_{2,2} \oplus m_{2,4}$ |

Table 6 illustrates a B code of length 6. All symbols are binary bits and all operations are XORs. The code is MDS and is able to correct two node (column) erasures. Each message bit is checked by exactly two parities, implying optimal encoding complexity because this is necessary to correct two erasures. In general, B codes of minimum distance 3 and with similar properties can be constructed for any length p−1, where p is prime, in the following way: construct the dual B code of length p−1 and switch the role of information bits and parity bits. Specifically, the parity bit of node i in the B code corresponds to the information bit of node i in the dual B code, i.e., $m_i$; in the dual B code, $m_i$ is checked by n−2 parities; these n−2 parities are regarded as information bits in the B code, where they are exactly the set of information bits check by the parity bit of node i.

Construction 8

(B Code). Let p be a prime, $$t = \frac{p-1}{2}$$

and let $m_{i,j}$, i∈[t−1], j∈[p−1] be the message bits. The codewords of the B code forms a t×(p−1) array, described by the following encoding mapping. The first t−1 rows of the array consists of the systematic symbols, i.e., $c_{i,j}=m_{i,j}$, for i∈[t−1], j∈[p−1]. The t-th row consists of the redundant symbols, i.e., $$c_{t,j} = \bigoplus_{k=1}^{t-1}\left(m_{k,\langle\frac{j}{k+1}\rangle} \oplus m_{k,\langle-\frac{j}{k}\rangle}\right),$$

for j∈[p−1].

The basis for Construction 4 can be illustrated as follows. By Lemma 2, the B codes are MDS and can correct two node erasures. In the (p−3)t×(p−1)t generator matrix of the B code, each row has exactly three 1's, meeting the obvious lower bound (the B code has minimum distance 3), and therefore the B code has a lowest density generator matrix.

Next, with Construction 9, the (n=p−1,k=p−5,r=2,z=2) secure RAID scheme based on the B code is described.

Construction 9

(Secure B). Let p be a prime and $$t = \frac{p-1}{2}.$$

Let $u_1, \ldots, u_{p-1}$ be the uniformly distributed key bits and let $m_{i,j}$, i∈[t−2], j∈[p−1] be the message bits. The codewords of secure B forms a t×(p−1) array, described by the following encoding mapping. The first row of the array consists of the systematic key symbols, i.e., $c_{1,j}=u_j \oplus u_{\langle 2 \cdot j \rangle} \oplus u_{\langle -j \rangle}$, j∈[p−1]. The 2-nd to (t−1)-th rows are the systematic message symbols, i.e., $c_{i,j}=u_{\langle (i+1) \cdot j \rangle} \oplus u_{\langle -i \cdot j \rangle} \oplus m_{i-1,j}$, for i∈[2, t−1], j∈[p−1]. The t-th row consists of the redundant symbols, which are computed by encoding the B code described in Construction 8, regarding the first (t−1)-rows of the array as information symbols.

An example of the Construction 5 scheme is shown in Table 7 below.

TABLE 7

| Node 1 | Node 2 | Node 3 | Node 4 | Node 5 | Node 6 |
|---|---|---|---|---|---|
| $u_1 \oplus u_2 \oplus u_6$ | $u_2 \oplus u_4 \oplus u_5$ | $u_3 \oplus u_6 \oplus u_4$ | $u_4 \oplus u_1 \oplus u_3$ | $u_5 \oplus u_3 \oplus u_2$ | $u_6 \oplus u_5 \oplus u_1$ |
| $u_3 \oplus u_5 \oplus m_1$ | $u_6 \oplus u_3 \oplus m_2$ | $u_2 \oplus u_1 \oplus m_3$ | $u_5 \oplus u_6 \oplus m_4$ | $u_1 \oplus u_4 \oplus m_5$ | $u_4 \oplus u_2 \oplus m_6$ |

TABLE 7-continued

| Node 1 | Node 2 | Node 3 | Node 4 | Node 5 | Node 6 |
|---|---|---|---|---|---|
| $u_\Sigma \oplus u_1 \oplus$ $u_4 \oplus m_3 \oplus m_5$ | $u_\Sigma \oplus u_2 \oplus$ $u_1 \oplus m_6 \oplus m_3$ | $u_\Sigma \oplus u_3 \oplus$ $u_5 \oplus m_2 \oplus m_1$ | $u_\Sigma \oplus u_4 \oplus$ $u_2 \oplus m_5 \oplus m_6$ | $u_\Sigma \oplus u_5 \oplus$ $u_6 \oplus m_1 \oplus m_4$ | $u_\Sigma \oplus u_6 \oplus$ $u_3 \oplus m_4 \oplus m_2$ |

In Table 7, the (6,2,2,2) secure B scheme. $u_\Sigma = \oplus_{i=1}^{p-1} u_i$. The first row stores the (relaxed) systematic key bits, the middle row(s) stores the systematic message bits, and the last row is redundant. The scheme is optimal in the middle row(s), because each message bit is padded by exactly two keys necessary for secrecy. Furthermore, the scheme is almost optimal in the last row, because each parity must involve at least two keys for secrecy and two message bits for reliability. Hence a parity involves only one more special key $u_\Sigma$, and takes one more XOR than optimal. The scheme is slightly suboptimal in the first row of keys. However encoding this row takes $2(p-1)$ XORs which is insignificant when amortized over the $$\frac{p^2 - 6p + 5}{2}$$

message bits; and decoding the keys from this row is also efficient, see Algorithm 1 below.

Similar to previous discussion, the notion behind the construction is to let $c_2$ be the B code and design $c_1$ so that it takes a form similar to the dual B code, because it is low rate, MDS, and has optimal encoding complexity. However, the dual B code is not contained in the B code, and therefore $c_1$ must be carefully designed to meet $c_1 \subset c_2$ without compromising complexity.

Note that the way the keys are padded to the systematic message symbols in Table 7 is similar to the dual B code. With the construction method in Section IV.A in mind, the idea is to choose $c_2$ to be the B code and design $c_1$ based on the dual B code. Refer to Table 4 for an example of secure B. Encoding the scheme is straightforward by Construction 9. Algorithm 1 below describes the systematic decoding algorithm when no erasure occurs. The correctness of Algorithm 1 is substantially straightforward to those skilled in the art. In the case of no more than r=2 node erasures, the erasure decoding algorithm of the B code is invoked to correct the erasures, and then Algorithm 1 may be invoked to decode the secret message. For additional background information, see L. Xu et al., *IEEE Transactions on Information Theory*, 45(6):1817-1826 (1999).

Additional commentary on Construction 9 is given by Lemma 4, below, which is followed by its proof.

Lemma 4.
In Construction 9, $$c_{t,j} = u_\Sigma \oplus u_j \oplus u_{\langle j/2 \rangle} \oplus \left( \oplus_{k=2}^{t-1} \left( m_{k-1,\langle \frac{j}{k+1} \rangle} \oplus m_{k-1,\langle \frac{j}{k} \rangle} \right) \right),$$

where $u_\Sigma = \oplus_{i=1}^{p-1} u_i$.
Proof.
Firstly:

$$c_{t,j} \stackrel{(a)}{=} \bigoplus_{k=1}^{t-1} \left( c_{k,\langle \frac{j}{k+1} \rangle} \oplus c_{k,\langle -\frac{j}{k} \rangle} \right)$$

-continued
$$= c_{1,\langle \frac{j}{2} \rangle} \oplus c_{1,\langle -j \rangle} \oplus \left( \bigoplus_{k=2}^{t-1} \left( c_{k,\langle \frac{j}{k+1} \rangle} \oplus c_{k,\langle \frac{j}{k} \rangle} \right) \right)$$

$$\stackrel{(b)}{=} u_{\langle j/2 \rangle} \oplus u_j \oplus u_{\langle -j/2 \rangle} \oplus u_{\langle -j \rangle} \oplus u_{\langle -2j \rangle} \oplus u_j \oplus$$
$$\left( \bigoplus_{k=2}^{t-1} \left( c_{k,\langle \frac{j}{k+1} \rangle} \oplus c_{k,\langle \frac{j}{k} \rangle} \right) \right)$$

$$= u_{\langle j/2 \rangle} \oplus u_{\langle -j/2 \rangle} \oplus u_{\langle -j \rangle} \oplus u_{\langle -2j \rangle} \oplus \left( \bigoplus_{k=2}^{t-1} \left( c_{k,\langle \frac{j}{k+1} \rangle} \oplus c_{k,\langle \frac{j}{k} \rangle} \right) \right)$$

$$\stackrel{(c)}{=} u_{\langle j/2 \rangle} \oplus u_{\langle -j/2 \rangle} \oplus u_{\langle -j \rangle} \oplus u_{\langle -2j \rangle} \oplus$$
$$\left( \bigoplus_{k=2}^{t-1} \left( u_{\langle \frac{(k+1)j}{k+1} \rangle} \oplus u_{\langle \frac{kj}{k+1} \rangle} \oplus m_{k-1,\langle \frac{j}{k+1} \rangle} \oplus u_{\langle \frac{(k+1)j}{k} \rangle} \oplus u_{\langle \frac{kj}{k} \rangle} \oplus m_{k-1,\langle \frac{j}{k} \rangle} \right) \right)$$

$$= u_{\langle j/2 \rangle} \oplus u_{\langle -j/2 \rangle} \oplus u_{\langle -j \rangle} \oplus u_{\langle -2j \rangle} \oplus \left( \bigoplus_{k=2}^{t-1} \left( u_{\langle \frac{kj}{k+1} \rangle} \oplus u_{\langle \frac{(k+1)j}{k} \rangle} \right) \right) \oplus$$
$$\left( \bigoplus_{k=2}^{t-1} \left( m_{k-1,\langle \frac{j}{k+1} \rangle} \oplus m_{k-1,\langle \frac{j}{k} \rangle} \right) \right)$$

$$\stackrel{(d)}{=} u_{\langle j/2 \rangle} \oplus u_{\langle -j \rangle} \oplus \left( \bigoplus_{k=1}^{t-1} \left( u_{\langle \frac{kj}{k+1} \rangle} \oplus u_{\langle \frac{(k+1)j}{k} \rangle} \right) \right) \oplus$$
$$\left( \bigoplus_{k=2}^{t-1} \left( m_{k-1,\langle \frac{j}{k+1} \rangle} \oplus m_{k-1,\langle \frac{j}{k} \rangle} \right) \right)$$

$$\stackrel{(e)}{=} u_{\langle j/2 \rangle} \oplus u_{\langle -j \rangle} \oplus u_\Sigma \oplus u_j \oplus u_{\langle -j \rangle} \oplus \left( \bigoplus_{k=2}^{t-1} \left( m_{k-1,\langle \frac{j}{k+1} \rangle} \oplus m_{k-1,\langle \frac{j}{k} \rangle} \right) \right)$$

$$= u_\Sigma \oplus u_j \oplus u_{\langle j/2 \rangle} \oplus \left( \bigoplus_{k=2}^{t-1} \left( m_{k-1,\langle \frac{j}{k+1} \rangle} \oplus m_{k-1,\langle \frac{j}{k} \rangle} \right) \right)$$

where (a) follows from Construction 4; (b) and (c) follows from Construction 5; (d) follows from merging $u_{\langle -j/2 \rangle}$ and $u_{\langle -2j \rangle}$ into the summation; and (e) follows from the fact that $$\bigoplus_{k=1}^{t-1} \left( u_{\langle -\frac{kj}{k+1} \rangle} + u_{\langle -\frac{(k+1)j}{k} \rangle} \right) = u_\Sigma \oplus u_j \oplus u_{\langle -j \rangle},$$

which is now proved. Note that $$\left\langle \frac{k}{k+1} \right\rangle = \left\langle \frac{k'}{k'+1} \right\rangle$$

implies $\langle k \rangle = \langle k' \rangle$;

$$\left\langle \frac{k+1}{k} \right\rangle = \left\langle \frac{k'+1}{k'} \right\rangle$$

implies $\langle k \rangle = \langle k' \rangle$;

$$\left\langle \frac{k}{k+1} \right\rangle = \left\langle \frac{k'+1}{k'} \right\rangle$$

implies that $\langle k+k' \rangle = p-1$, and therefore it follows that in the summation, the $2(t-1)=p-3$ summands are distinct. Denote by J the set of the indexes of the summands, then J contains $1, 2, \ldots, p-1$ except two elements. Because $$\left\langle \frac{k}{k+1} \right\rangle \neq 1 \text{ and } \left\langle \frac{k+1}{k} \right\rangle \neq 1,$$

it follows that $\langle -j \rangle \notin J$. Because $$\left\langle \frac{k}{k+1} \right\rangle = \langle -1 \rangle \text{ and } \left\langle \frac{k+1}{k} \right\rangle = \langle -1 \rangle$$

both imply that $\langle k \rangle = t$, it follows that $j \notin J$. Hence $J = [p-1] \setminus \{j, \langle -j \rangle\}$, implying $$\bigoplus_{k=1}^{t-1} \left( u_{\left\langle -\frac{kj}{k+1} \right\rangle} \oplus u_{\left\langle -\frac{(k+1)j}{k} \right\rangle} \right) = u_\Sigma \oplus u_j \oplus u_{\langle -j \rangle}.$$

This completes the proof.

Theorem 9 provides an additional optimality indication. The statement of Theorem 9 is followed by its proof.

although u is not stored in the uncoded form, it can be decoded from the systematic key entries (see Algorithm 1). Finally, the encoding mapping of $c_1$ is given by fixing m to be 0 in Construction 5. More specifically, consider encoding information bits $u_1, \ldots, u_{p-1}$ using $c_1$, and denote the codeword by $A=(a_{i,j})$. Then by Construction 5, $a_{1,j}=u_j \oplus u_{\langle 2j \rangle} \oplus u_{\langle -j \rangle}$, $a_{i,j}=u_{\langle (i+1)j \rangle} \oplus u_{\langle -i \cdot j \rangle}$, for $i \in [2,t-1]$, $j \in [p-1]$. And by Lemma 4, $a_{t,j}=u_\Sigma \oplus u_j \oplus u_{\langle j/2 \rangle}$ for $j \in [p-1]$. Consider encoding the same set of information bits $u_1, \ldots, u_{p-1}$ using the dual B code described in Construction 3, and denote the codeword by $B=(b_{i,j})$. Then for $i \in [2,t-1]$, $j \in [p-1]$, it follows that $a_{1,j}=b_{1,j} \oplus b_{2,j}$, $a_{i,j}=b_{i+1,j}$ and $a_{t,j}=\oplus_{l=2}^{t} b_{l,j}$. On the other hand, for $i \in [3,t]$, $j \in [p-1]$, it follows that $b_{1,j}=\oplus_{l=1}^{t} a_{l,j}$, $b_{2,j}=\oplus_{l=2}^{t} a_{l,j}$, and $b_{i,j}=a_{i-1,j}$. Therefore, $c_1$ and the dual B code are equivalent, and have the same minimum distance. By Theorem 6, $c_1$ is MDS. By Corollary 2, it follows that Construction 5 is a $(p-1, p-5, 2, 2)$ secure RAID scheme. Next, the density of G is studied. A key $u_i$ or a message bit $m_{i,j}$ is said to be checked by $c_{a,b}$ if in G the row corresponding to $u_i$ or $m_{i,j}$ is 1 in the $(at+b)$-th entry (which corresponds to $c_{a,b}$). By construction, $u_1$ is checked by $c_{t,b}$ for $b=1, \ldots, p-1$, $b \neq i$, $\langle 2i \rangle$, and is checked by exactly one element of $\{c_{a,1}, \ldots, c_{a,t-1}\}$ for $a=1, \ldots, p-1$, $a \neq \langle 2i \rangle$. Therefore $u_i$ is checked for exactly $p-2+p-3=2p-5$ times. A message bit $m_{i,j}$ is checked by $c_{i+1,j}$, $c_{1,\langle (i+2)j \rangle}$ and $c_{t,\langle -(i+1)j \rangle}$. Therefore $m_{i,j}$ is checked for exactly 3 times. This completes the proof.

It is possible to describe an algorithm for systematic decoding for the codes described herein. By Theorem 2, a lower bound on the density of the key rows is $p-2$ and a lower bound on the density of the message rows is 3. Therefore, for the message rows, the scheme achieves the lowest density. For the key rows, the scheme achieves the lower bound within a factor of 2. Algorithm 1 is given below.

---

Algorithm 1:

Algorithm $1_m = \text{Dec}(C)$; Systematic Decoding.

1: for $i \leftarrow 1$ to t do  ▷ Decode keys from $c_{1,j}$, $j \in [p-1]$. Recall that $t = \frac{p-1}{2}$.
2: $x \leftarrow c_{1,\langle i/4 \rangle} \oplus c_{1,\langle -i/4 \rangle}$  ▷ $x = u_{\langle i/2 \rangle} + u_{\langle -i/2 \rangle}$
3: $u_i \leftarrow c_{1,\langle i/2 \rangle} \oplus x$
4: $u_i \leftarrow c_{1,\langle -i/2 \rangle} \oplus x$
5: end for  ▷ All keys have been decoded.
6: for $i \leftarrow 2$ to $t-1$ and $j \leftarrow 1$ to $p-1$ do
7: $m_{i-1,j} \leftarrow c_{i,j} \oplus u_{\langle (i+1)j \rangle} \oplus u_{\langle -i \cdot j \rangle}$  ▷ Cancel keys to obtain message bits.
8: end for

---

Theorem 9.

Secure B is a $(p-1, p-5, 2, 2)$ secure RAID scheme over $F_2^t$, for any prime p and $$t = \frac{p-1}{2}.$$

In particular, the density of the key rows of the generator matrix is $2p-5$, and the density of the message rows is 3.

Proof.

The scheme is interpreted using the method described in Section IV.A above and applying Corollary 2 to prove the correctness of the scheme. It should be clear from the construction that: $c_2$ can be regarded as the B code; $c_{i,j}$, $i \in [2, t-1]$, $j \in [p-1]$ as the systematic message entries; and $c_{1,j}$, $j \in [p-1]$ as the systematic key entries. Note that Algorithm 1 describes a systematic decoding algorithm for the disclosed scheme. In the case of erasures and/or error, the erasure/error decoding algorithm of the B code may be invoked to correct the erasures, and then Algorithm 1 may be invoked to decode the secret message. The B code erasure/error decoding algorithm may be found in, for example, L. Xu et al., *IEEE Transactions on Information Theory*, 45(6):1817-1826 (1999). Encoding the scheme according to Construction 5 requires a total number of $2p^2 - 9p + 7$ XORs, or on average $$4 + \frac{6}{p-5} XORs$$

per message bit. Systematic decoding the scheme according to Algorithm 1 requires a total number of $$p^2 - \frac{9}{2}p + \frac{7}{2} XORs,$$

or on average $$2 + \frac{3}{p-5} XORs$$

per message bit. Encoding each message bit requires at least $$4 + \frac{2}{p-5} XORs$$

by Corollary 1, and decoding each message bit requires at least 2 XORs. Therefore the secure B scheme has almost optimal encoding and systematic decoding complexities.

A. Optimal Secure RAID Scheme from B Codes

The secure RAID schemes constructed above are almost optimal in terms of density and computational complexity. This subsection describes construction of strictly optimal schemes from the B codes. More particularly, this subsection describes construction of optimal (p−1, p−5,2,2) secure RAID schemes over $F_2^t$, where $$t = \frac{p-1}{2},$$

for any prime p ranging from 7 to 53. The discussion begins with a definition.

Definition 3.

Let p be a prime, $$t = \frac{p-1}{2},$$

and let σ: [t]→[t] be a permutation. It is said that σ is proper with respect to p if σ(1)≠t and that for every codeword C=($c_{i,j}$) of the dual B code, $c_{\sigma(i),j}$ is a codeword of the B code. With Defintion 3, it is possible to provide Construction 10.

Construction 10

(Optimal Secure B.) Let p be a prime, $$t = \frac{p-1}{2},$$

and let σ: [t]→[t] be a proper permutation with respect to p. Let $u_1, \ldots, u_{p-1}$ be uniformly distributed key bits. The codewords of optimal secure B forms a t×(p−1) array. The first t−1 rows of the array are the systematic key and message symbols, computed as follows. Denote by C'=$c'_{i,j}$ the codeword of the dual B code computed by encoding the $u_j$'s as information symbols and denote i*=σ(1), then $c_{i^*,j}=c'_{1,j}=u_j$, j∈[p−1]; for i≠i*,i∈[t−1], j∈[p−1], $c_{i,j}=c'_{\sigma(i),j}$ $\oplus m_{i,j}$, where the $m_{i,j}$'s are the message bits. The t-th row consists of the redundant symbols, which are computed by encoding the B code regarding the first (t−1)-rows of the array as information symbols.

An example of the optimal secure B schemes is shown in FIG. 3. The proper permutation (in cycle representation) is given by σ=(1)(2,3). For cycle representation, see, for exmaple, D. S. Dummit and R. M. Foote, *Abstract Algebra*, Wiley (2003). It can be helpful to compare FIG. 3 to FIG. 4 and Table 3 to see the effect of changing σ. Another optimality condition is given by Theorem 10 below, which is followed by its proof.

Theorem 10.

The encoding scheme in Construction 6 is a (p−1, p−5, 2,2) secure RAID scheme over $F_2^t$. In particular, the key rows of the generator matrix have optimal density p−2, and the message rows have optimal density 3.

Proof.

Similar as before, the scheme is interpreted using the method described in Section IV.A above. It follows from the construction that $c_1$ is the dual B code for which the rows of the codeword array is permuted according to σ, and $c_1$ is the B code. Since both $c_1$ and $c_2$ are MDS, by Corollary 2 the scheme is a (p−1, p−5,2,2) secure RAID scheme. By Construction 3, each key bit appears in exactly p−2 of the $c_{i,j}$'s, and by Construction 4, each message bit appears in exactly three of the $c_{i,j}$'s. Therefore, each key row has density p−2 and each message row has density 3, meeting the lower bound in Theorem 2 and proving the theorem.

It should be noted that encoding Construction 6 requires $$4 + \frac{2}{p-5} XORs$$

to encode each message bit and achieves the lower bound of Corollary 1. Systematic decoding the scheme, by first reading the keys and then canceling them from the systematic message symbols, requires two XORs to decode each message bit, again achieving the obvious lower bound. Therefore, Construction 6 has optimal encoding and systematic decoding complexity. An additional matter to address is whether a proper permutation σ exists and how to construct it. There is no known method at present that may be used to construct proper permutations with respect to an arbitrary prime p. However, considering an arbitrary permutation σ, the following result of Lemma 5 is useful in determining whether σ is proper.

Lemma 5.

Let p be a prime, $$t = \frac{p-1}{2},$$

and let σ: [t]→[t] be a permutation such that σ(1)=i*≠t. Consider five multisets $$A_1 = \left\{\left\{\frac{\sigma^{-1}(i)}{i+1}\right\} : i \in [t-1], i \neq i^*\right\},$$

$$A_2 = \left\{\left\{\frac{1-\sigma^{-1}(i)}{i+1}\right\} : i \in [t-1], i \neq i^*\right\},$$

$$A_3 = \left\{\left\{-\frac{\sigma^{-1}(i)}{i}\right\} : i \in [t-1], i \neq i^*\right\},$$

-continued $$A_4 = \left\{ \left( \frac{\sigma^{-1}(i)-1}{i} \right) : i \in [t-1], i \neq i^* \right\}$$

and $$A_5 = \bigcup_{i=1}^{4} A_i \cup \left\{ \left( \frac{1}{i^*+1} \right), \left( -\frac{1}{i^*} \right) \right\}.$$

Then σ is proper with respect to p if and only if $\sigma^{-1}(t)$ and $\langle 1-\sigma^{-1}(t) \rangle$ are elements of A, with odd multiplicity and all other elements of A, have even multiplicity.

The lemma above can be proved by verifying Definition 3 according to Construction 8 and Construction 9. The details are omitted as within the abilities of those skilled in the art. With Lemma 5 we can easily check whether a given σ is proper or not. Therefore a proper σ with respect to a given p, if exists, can be found by exhaustive search. Proper σ with respect to $7 \leq p \leq 53$ are listed in Table 8 below. While finding a proper σ with respect to p significantly larger than 53 by exhaustive search is prohibitive, it is believed that they exist with respect to an infinite sequence of p.

TABLE 8

| p | σ |
|---|---|
| 7 | (1) (2 3) |
| 11 | (1 4 2) (3) (5) |
| 13 | (1 5 3) (2) (4) (6) |
| 17 | (1) (2 8 3 6 4 7) (5) |
| 19 | (1 2) (3 9 8 4) (5 7) (6) |
| 23 | (1) (2 11 10 3 4 9 8 7 6 5) |
| 29 | (1) (2 14) (3 13 12 11 10 7 5 4) (6) (8 9) |
| 31 | (1) (2 15 12 11 6 5) (3 4) (7 10 9 8) (13 14) |
| 37 | (1 3 8 5 4 18 17 16 15 14 11 10 9 2) (6 7) (12 13) |
| 41 | (1 9 8 7 6 5 4) (2 3) (10 20 17 14 13 12 11) (15 16) (18 19) |
| 43 | (1 15 14 13) (2 12 11 10) (3 9 8 7 18 17 16 21 20 19 6 5) (4) |
| 47 | (1 17 9 15 5 4 3 2) (6 14 13 12 7) (8 11 10 16) (18 23 22 21 20) (19) |
| 53 | (1 5 4 3 18 8 7 15 14 13 12 24 23 10 9 17 16 6 26) (2 25 11 22 21 20 19) |

VIII. Additional Embodiments

Figure 5:
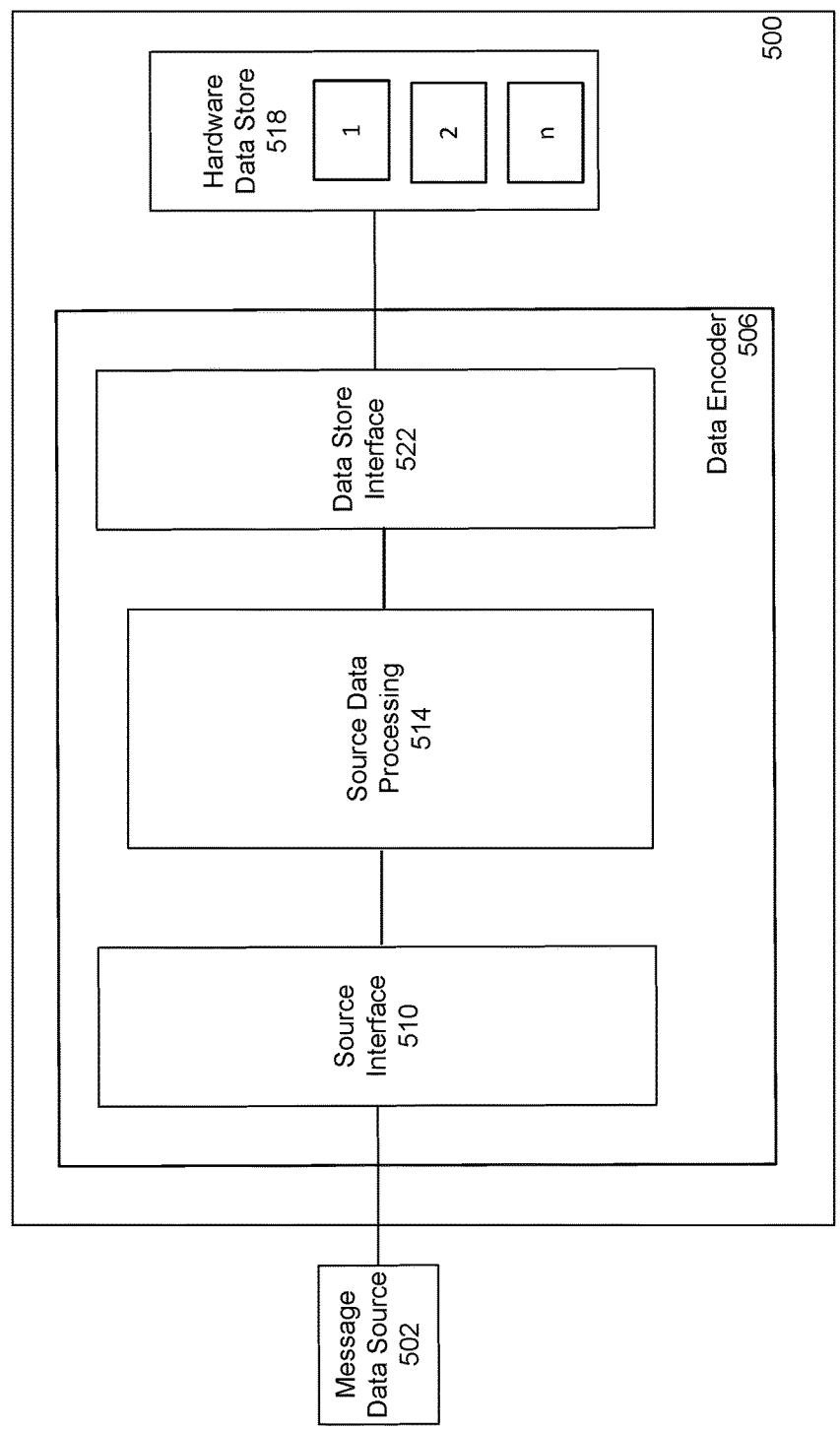
FIG. 5 is an illustration of a data store device constructed in accordance with the present disclosure.

FIG. 5 is an illustration of a data store system 500 constructed in accordance with the present disclosure. The system 500 receives data from a message data source 502 that communicates with a data encoder 506 of the system through a source interface 510 of the processor. The source interface may perform services that help the data source 502 communicate with the data encoder 506, such as for ensuring proper network communications. The data encoder 506 also includes a source data processor 514 that scrambles data according to a predetermined coding scheme and passes the scrambled data to a hardware data store 518 through a data store interface 522. The data encoder also performs the functions of a generator matrix for storage into a RAID array and provides scrambled data according to a secure RAID scheme. The message data source 502 may comprise, for example, a user of the data encoder 506 or a data store service with which the data encoder is associated. The hardware data store 518 may comprise, for example, multiple data nodes of a storage network, or may comprise a RAID array, or any manner of multiple data storage nodes, or locations. For example, the data store 518 may include multiple disk drives of a RAID array, or may comprise multiple network node locations at which data may be stored. Each of the data store locations, for example, may be one or more nodes of an online storage provider, such as"Dropbox" or "Google Store" or other "cloud storage" services. These services may be "mixed and matched" to collectively make up the storage locations or nodes of the data store 518. The multiple node/device nature of the hardware data store 518 is indicated by the multiple, independent boxes 1, 2, . . . , n that are placed within the diagram block of the data store.

The processing components such as the message data source 502, the data encoder 506, and the hardware data store 518 may be implemented in the form of control logic in software or hardware or a combination of both, and may comprise one or more processors that execute software program instructions from program memory, or as firmware, or the like. Any or all of the processing components may comprise a conventional computer apparatus. A conventional computer apparatus also may carry out the operations described herein and depicted in FIG. 2.

Figure 6:
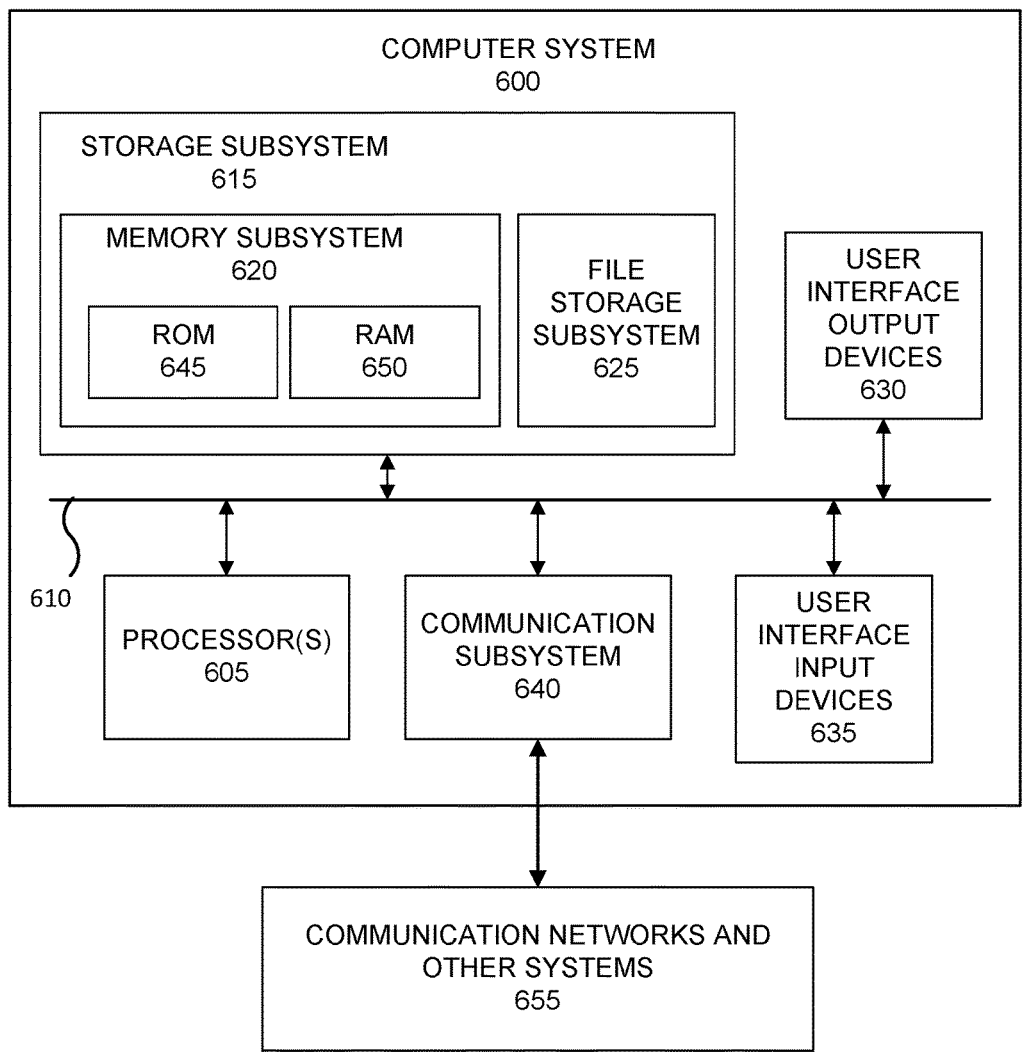
FIG. 6 is a block diagram of a computer apparatus for performing the receiving and storing operations described herein.

FIG. 6 is a block diagram of a computer apparatus 600 with sufficient resources to perform the operations described herein and depicted in FIG. 6. The computer system 600 typically includes one or more processors 605, a system bus 610, storage subsystem 615 that includes a memory subsystem 620 and a file storage subsystem 625, user interface output devices 630, user interface input devices 635, a communications subsystem 640, and the like.

In various embodiments, the computer system 600 typically includes conventional computer components such as the one or more processors 605. The file storage subsystem 625 can include a variety of memory storage devices, such as a read only memory (ROM) 645 and random access memory (RAM) 650 in the memory subsystem 620, and direct access storage devices such as disk drives.

The user interface output devices 630 can comprise a variety of devices including flat panel displays, touchscreens, indicator lights, audio devices, force feedback devices, and the like. The user interface input devices 635 can comprise a variety of devices including a computer mouse, trackball, trackpad, joystick, wireless remote, drawing tablet, voice command system, eye tracking system, and the like. The user interface input devices 635 typically allow a user to select objects, icons, text and the like that appear on the user interface output devices 630 via a command such as a click of a button or the like.

Embodiments of the communication subsystem 640 typically include an Ethernet card, a modem (telephone, satellite, cable, ISDN), (asynchronous) digital subscriber line (DSL) unit, FireWire (IEEE 1394) interface, USB interface, and the like. For example, the communications subsystem 640 may be coupled to communications networks and other external systems 655 (e.g., a network such as a LAN or the Internet), to a FireWire bus, or the like. In other embodiments, the communications subsystem 640 may be physically integrated on the motherboard of the computer system 600, may be a software program, such as soft DSL, or the like.

The RAM 650 and the file storage subsystem 625 are examples of tangible media configured to store data such as error correction code parameters, codewords, and program instructions to perform the operations described herein when executed by the one or more processors, including executable computer code, human readable code, or the like. Other types of tangible media include program product media such as floppy disks, removable hard disks, optical storage media such as CDs, DVDs, and bar code media, semiconductor memories such as flash memories, read-only-memories (ROMs), battery-backed volatile memories, networked storage devices, and the like. The file storage subsystem 625 includes reader subsystems that can transfer data from the program product media to the storage subsystem 615 for operation and execution by the processors 605.

The computer system 600 may also include software that enables communications over a network (e.g., the communications network 655) such as the DNS, TCP/IP, UDP/IP, and HTTP/HTTPS protocols, and the like. In alternative embodiments, other communications software and transfer protocols may also be used, for example IPX, or the like.

It will be readily apparent to one of ordinary skill in the art that many other hardware and software configurations are suitable for use with the present disclosure. For example, the computer system 600 may be a desktop, portable, rack-mounted, or tablet configuration. Additionally, the computer system 600 may be a series of networked computers. Further, a variety of microprocessors are contemplated and are suitable for the one or more processors 605, such as PENTIUM™ microprocessors from Intel Corporation of Santa Clara, Calif., USA; OPTERON™ or ATHLON XP™ microprocessors from Advanced Micro Devices, Inc. of Sunnyvale, Calif., USA; and the like. Further, a variety of operating systems are contemplated and are suitable, such as WINDOWS®, WINDOWS XP®, WINDOWS VISTA®, or the like from Microsoft Corporation of Redmond, Wash., USA, SOLARIS® from Sun Microsystems, Inc. of Santa Clara, Calif., USA; MAC OS available from Apple, Inc. of Sunnyvale, Calif., USA; various Linux and UNIX distributions, and the like. In still other embodiments, the techniques described above may be implemented upon a chip or an auxiliary processing board (e.g., a programmable logic device or graphics processor unit).

The present disclosure describes techniques that can be implemented in the form of control logic in software or hardware or a combination of both. The control logic may be stored in an information storage medium as a plurality of instructions adapted to direct an information-processing device to perform a set of steps disclosed in embodiments of the present disclosure. Based on the disclosure and teachings provided herein, a person of ordinary skill in the art will appreciate other ways and/or methods to implement the present techniques.

IX. Conclusion

In summary, disclosed are low-complexity schemes to store information in a distributed manner across multiple nodes of a computer system. The schemes are resilient to node failures and resistant to node eavesdropping. The disclosed schemes may be used in conjunction with RAID systems, and when used in such systems may be referred to as "secure RAID".

What is claimed is:

1. A storage system comprising:
    a data source interface that receives message data m from a message data source for transfer to a hardware data store, wherein the message data m includes multiple message symbols; and
    a data encoder that
        encodes a set of random symbols according to a first erasure code C1, sums the multiple message symbols of m with a subset of the symbols of the first erasure code C1 and produces a summed codeword, and then encodes a subset of symbols of the summed codeword with a second erasure code C2 and produces output symbols that are sent to nodes of the hardware data store,
        wherein the data encoder selects a default value that is assigned to a subset of the output symbols of C2 such that the default value subset symbols are not assigned to any of the hardware data store nodes and the remaining output symbols are assigned to one or more of the hardware data store nodes; and
        wherein the data encoder further scrambles the received message data according to parameters k, r, z, wherein k corresponds to a message size, r corresponds to a number of hardware data store nodes that will be tolerated for failure or erasure, and z corresponds to a number of hardware data store shares that if compromised are not sufficient to reveal information about the received message data.

2. The storage system as in claim 1, wherein the data encoder sums the multiple message symbols and the subset of symbols of the first erasure code C1 using an XOR operation of bits.

3. The storage system as in claim 1, wherein the data encoder sums the multiple message symbols and the subset of symbols of the first erasure code C1 using an XOR operation over an algebraic structure including any one of either groups, rings, or fields.

4. The storage system as in claim 1, wherein the second erasure code C2 is a systematic code.

5. The storage system as in claim 4, wherein the first erasure code C1 is a systematic code.

6. The storage system as in claim 4, wherein at least one of the first erasure code C1 or the second erasure code C2 is an MDS (Maximum Distance Separable) code or an MDS array code.

7. The storage system as in claim 6, wherein the second erasure code C2 comprises one of either EVENODD codes, shortened EVENODD codes, STAR codes, B codes, or Reed-Solomon codes.

8. The storage system as in claim 7, wherein the first erasure code C1 comprises one of either dual EVENODD codes, dual shortened EVENODD codes, dual STAR codes, dual B codes, Reed-Solomon codes, or their equivalents.

9. The storage system as in claim 1, wherein the default value is zero.

10. The storage system as in claim 1, wherein the number of symbols into which the message data m is divided is determined according to the number of nodes in the hardware data store.

11. The storage system as in claim 1, wherein the data encoder determines the data store nodes to which scrambled message elements are sent.

12. The storage system as in claim 1, wherein the hardware data store includes n nodes and the data encoder scrambles the received message data into n shares, and the random symbols comprise a linear message coding scheme.

13. The storage system as in claim 1, wherein the hardware data store comprises a RAID storage array that stores data according to a secure RAID scheme with the parameters k, r, z for the message data m.

14. A computer method of processing message data, the method comprising:
    receiving message data m from a message data source for transfer to a hardware data store;
    encoding a set of random symbols at a data encoder according to a first erasure code C1, summing the multiple message symbols of m with a subset of symbols of the first erasure code C1 and producing a summed codeword, and encoding a subset of symbols of the summed codeword at the data encoder with a second erasure code C2 and producing output symbols that are sent to nodes of the hardware data store, wherein the data encoder selects a default value that is assigned to a subset of the output symbols of C2 such that the default value subset symbols are not assigned to any of the hardware data store nodes and the remaining output symbols are assigned to one or more of the hardware data store nodes; and wherein the data encoder further scrambles the received message data according to parameters k, r, z, wherein k corresponds to a message size, r corresponds to a number of hardware data store nodes that will be tolerated for failure or erasure, and z corresponds to a number of hardware data store shares that if compromised are not sufficient to reveal information about the received message data.

15. The method as in claim 14, wherein the data encoder sums the multiple message symbols and the subset of symbols of the first erasure code C1 using an XOR operation of bits.

16. The method as in claim 14, wherein the data encoder sums the multiple message symbols and the subset of symbols of the first erasure code C1 using an XOR operation over an algebraic structure including any one of either groups, rings, or fields.

17. The method as in claim 14, wherein the second erasure code C2 is a systematic code.

18. The method as in claim 17, wherein the first erasure code C1 is a systematic code.

19. The method as in claim 17, wherein at least one of the first erasure code C1 or the second erasure code C2 is an MDS (Maximum Distance Separable) code or an MDS array code.

20. The method as in claim 19, wherein the second erasure code C2 comprises one of either EVENODD codes, shortened EVENODD codes, STAR codes, B codes, or Reed-Solomon codes.

21. The method as in claim 20, wherein the first erasure code C1 comprises one of either dual EVENODD codes, dual shortened EVENODD codes, dual STAR codes, dual B codes, Reed-Solomon codes, or their equivalents.

22. The method as in claim 14, wherein the default value is zero.

23. The method as in claim 14, wherein the number of symbols into which the message data m is divided is determined according to the number of nodes in the hardware data store.

24. The method as in claim 14, wherein the data encoder determines the data store nodes to which scrambled message elements are sent.

25. The method as in claim 14, wherein the hardware data store includes n nodes and the data encoder scrambles the received message data into n shares and the random symbols comprise a linear message coding scheme.

26. The method as in claim 14, wherein the hardware data store comprises a RAID storage array that stores data according to a secure RAID scheme with the parameters k, r, z for the message data m.

* * * * *